(12) United States Patent
Dowling et al.

(10) Patent No.: US 8,625,584 B2
(45) Date of Patent: *Jan. 7, 2014

(54) METHODS, SMART CARDS, AND SYSTEMS FOR PROVIDING PORTABLE COMPUTER, VOIP, AND APPLICATION SERVICES

(76) Inventors: Eric Morgan Dowling, Escazu (CR); Robert A. Westerlund, Jupiter, FL (US)

( * ) Notice: Subject to any disclaimer, the term of this patent is extended or adjusted under 35 U.S.C. 154(b) by 371 days.

This patent is subject to a terminal disclaimer.

(21) Appl. No.: 13/064,125

(22) Filed: Mar. 8, 2011

(65) Prior Publication Data

US 2011/0155804 A1   Jun. 30, 2011

Related U.S. Application Data

(62) Division of application No. 12/289,806, filed on Nov. 5, 2008, now Pat. No. 7,924,825, which is a division of application No. 10/930,821, filed on Sep. 1, 2004, now Pat. No. 7,451,921.

(51) Int. Cl.
    *H04L 12/66* (2006.01)

(52) U.S. Cl.
    USPC .......................................... 370/356; 370/352

(58) Field of Classification Search
    USPC ................................................ 370/351–356
    See application file for complete search history.

(56) References Cited

U.S. PATENT DOCUMENTS

| | | | |
|---|---|---|---|
| 4,759,056 A | 7/1988 | Akiyama | |
| 4,852,156 A | 7/1989 | Shigenaga | |
| 4,899,373 A | 2/1990 | Lee et al. | |
| 5,420,759 A | 5/1995 | Charlier et al. | |
| 5,557,665 A | 9/1996 | Yamamoto | |
| 5,724,417 A | 3/1998 | Bartholomew et al. | |
| 5,742,596 A * | 4/1998 | Baratz et al. | 370/356 |
| 5,814,798 A | 9/1998 | Zancho | |
| 5,841,854 A * | 11/1998 | Schumacher et al. | 379/265.11 |
| 6,185,288 B1 * | 2/2001 | Wong | 379/219 |
| 6,377,570 B1 | 4/2002 | Vaziri et al. | |
| 6,430,178 B1 | 8/2002 | Yariro | |
| 6,477,246 B1 * | 11/2002 | Dolan et al. | 379/211.02 |
| 6,542,498 B2 | 4/2003 | Socaciu | |
| 6,574,239 B1 | 6/2003 | Dowling et al. | |
| 6,651,883 B2 | 11/2003 | Schilling | |
| 6,683,870 B1 * | 1/2004 | Archer | 370/356 |
| 6,763,252 B2 | 7/2004 | Itazawa | |
| 6,765,967 B2 | 7/2004 | Dowling et al. | |
| 6,856,806 B1 | 2/2005 | Bosik et al. | |
| 6,873,850 B2 | 3/2005 | Dowling et al. | |
| 6,928,294 B2 * | 8/2005 | Maggenti et al. | 455/518 |

(Continued)

*Primary Examiner* — Phuc Tran
(74) *Attorney, Agent, or Firm* — Clay McGurk; The Law Office of Clay McGurk

(57) ABSTRACT

A smart card is used with a network based system to providing portable telecommunication and computing services. In an exemplary embodiment the smart card holds a user authentication code and user telephony account information. The smart card transfers the user authentication code and the account information to one of a plurality of geographically dispersed card readers which are each connected to a local telephony device. When the smart card is plugged into a first card reader, telephone calls directed to the smart card user's follow-me telephone number are received at a first local telephony device. When the smart card is plugged into a second smart card reader, telephone calls directed to the follow-me telephone number are received at a second telephony local device. Hence the user is enabled to receive and place calls using any of the geographically dispersed telephony devices as though they were his/her own personal landline or cellular telephone supplied by his/her telephony services provider.

13 Claims, 4 Drawing Sheets

(56) References Cited

U.S. PATENT DOCUMENTS

| | | |
|---|---|---|
| 7,050,427 B2 * | 5/2006 | Archer .......................... 370/356 |
| 7,092,380 B1 | 8/2006 | Chen et al. |
| 7,151,922 B2 | 12/2006 | Sashihara et al. |
| 7,154,901 B2 * | 12/2006 | Chava et al. .................. 370/401 |
| 7,192,235 B2 | 3/2007 | Blight et al. |
| 7,212,521 B2 | 5/2007 | Kwon |
| 7,225,334 B2 | 5/2007 | Bianchi |
| 7,293,061 B2 | 11/2007 | Dowling |
| 7,349,535 B2 * | 3/2008 | Shaffer et al. ............ 379/265.11 |
| 7,424,511 B2 | 9/2008 | Dowling |
| 7,451,921 B2 * | 11/2008 | Dowling et al. .............. 235/380 |
| 7,508,777 B2 | 3/2009 | Dowling |
| 7,631,105 B2 | 12/2009 | Dowling |
| 7,747,260 B2 * | 6/2010 | Dowling et al. .............. 455/458 |
| 7,924,825 B2 * | 4/2011 | Dowling et al. .............. 370/356 |
| 2004/0248593 A1 | 12/2004 | Hicks et al. |
| 2005/0074122 A1 | 4/2005 | Fascenda |
| 2005/0201318 A1 * | 9/2005 | Little ........................... 370/321 |
| 2005/0220079 A1 * | 10/2005 | Asokan ........................ 370/352 |

* cited by examiner

METHODS, SMART CARDS, AND SYSTEMS FOR PROVIDING PORTABLE COMPUTER, VOIP, AND APPLICATION SERVICES

This application is a divisional of U.S. patent application Ser. No. 12/289,806 filed on Nov. 5, 2008 now U.S. Pat. No. 7,924,825, which is a divisional of U.S. patent application Ser. No. 10/930,821 filed on Sep. 1, 2004, now issued as U.S. Pat. No. 7,451,921, issued Nov. 18, 2008, the entirety of the disclosure of which is herein incorporated by this reference thereto, for all purposes.

FIELD OF THE INVENTION

This invention relates generally to mobile computing and to network based telecommunication services. More particularly, the invention relates to methods and systems for providing computer and telecommunication services users with portable services.

BACKGROUND OF THE INVENTION

A certain class of telecommunication services is known as "follow-me" services. A follow-me telephone number, for example, allows a user to roam to different locations and to still receive incoming phone calls directed to the follow-me telephone number.

An example of a follow-me service is the one provided by Vonage, Inc. (see vonage.com). Vonage, Inc. supplies users with voice-over-Internet Protocol (VoIP) telephony services. A user can select one or more telephone numbers (Vonage™ numbers) in one or more local area codes to receive telephone calls. All telephone calls to the one or more local numbers get forwarded to the user via the Internet to a small VoIP (voice-over-Internet protocol) gateway that sits on the user's desktop. If the user travels to a different location, takes his/her VoIP gateway with him/her, and plugs the VoIP gateway via an Ethernet cable into a broadband Internet connection at the new location, the user can receive telephone calls directed to any of his/her Vonage™ numbers at a telephone connected to the VoIP gateway.

The above technology would allow, for example, a user residing in Costa Rica to receive telephone calls that were directed to a Miami (305) telephone number (e.g., a Vonage™ number using a Miami based point of presence). Now if the user were to travel to Spain and carry his/her equipment along, after re-installation of the Vonage™ desktop VoIP gateway, the user would then be able to receive telephone calls directed to the same Miami telephone number, but this time, the calls would be routed across the Internet to Spain instead of Costa Rica.

While this service is useful and beneficial, it has drawbacks. First of all, it is limited to VoIP connections which may be unreliable in terms of quality. Also, the user is required to carry a desktop VoIP gateway (sometimes called an "adapter") to the new location, find a broadband Internet connection, and plug the desktop VoIP gateway into it, e.g., via an Ethernet cable. In practice, due to differences in local system and home or office router configurations and/or the type of broadband Internet connection (e.g., DSL vs. cable modem), and whether a local router is even available, the re-installation can be non-trivial and may require calls to technical service to complete. In general, un-plugging and re-plugging can be more complicated than desired due to such differences in local network configurations. Moreover, the user is required to carry the desktop VoIP gateway and this can be cumbersome and puts the gateway at risk of loss, theft, or damage during travel.

Similar re-installation problems occur for systems where a telephone device and the VoIP desktop gateway are built into a single handset. Electrically, this is effectively the same type of system; while it is slightly more portable, the same re-installation problems tend to occur when plugged into different local networks having different local network configurations.

What is needed is a more portable solution that allows a user to move from location to location without loss of access to a personalized set of data, application, and/or telecommunications services, to accept or divert incoming calls, and/or to make outgoing calls using a telecommunication services account without the need to carry a desktop VoIP gateway or VoIP handset from one location to another. It would also be desirable to have a solution that were general enough to work with both VoIP based telecommunication services and also standard landline and/or cellular telecommunication services, as well as network-based (e.g., Internet-based) data and/or application services.

SUMMARY OF THE INVENTION

In one of its aspects, the present invention overcomes the aforementioned drawbacks and shortcomings of presently available systems by introducing a novel technique for providing portable, "follow-me" telecommunication services.

In one aspect of the present invention, a smart card is used to facilitate mobile access to a personalized set of data, application, and/or telecommunications services. Smart cards, as is well-known in the art, preferably include a memory, a processor, and a set of software interfaces that allow one or more application programs to execute on the smart card. The smart card, once plugged into or wirelessly coupled to a smart card reader, has the ability of communicating with a remote and/or local computer across the smart card interface.

In other embodiments of the present invention, rather than a smart card, a read-only memory card that functions primarily as a data storage medium can be used in the practice of the invention, such as a card that stores data in a magnetic stripe and/or ROM. Other forms of memory cards that both store data and can be written with new information from a card reader can also be advantageously employed. More generally, the present invention can be carried out by using any form or type of portable storage medium, such as an optical disc (e.g., a CD or DVD), a compact memory card (of any format), a memory stick, or any other type of portable storage medium that has the capability of storing the user-specific data that will facilitate the implementation of the present invention as described hereinafter. Presently, there also exist many varieties of Universal or Multimedia Card Readers that could be suitably employed in the practice of the present invention.

In preferred embodiments of the present invention, a smart card having a processor, memory, and a communication interface protocol is used. The more advanced and secure smart cards tend to include on-board RAM, ROM and/or EEPROM memory, a processor, and a standards-compliant (e.g., ISO 7816-complaint) interface protocol for enabling bidirectional communication with a smart card reader.

In accordance with one embodiment of the present invention, the smart card takes the place of one or more aspects, features, and/or functions of the desktop VoIP gateway as discussed in the background section and, optionally, also provides other capabilities. For example, a user could carry the smart card in his/her wallet, purse, or briefcase from Costa Rica to Spain. Upon arriving in Spain, the user would insert the smart card into a smart card reader that is coupled to a telecommunications network such as the Internet or a PSTN (public switched telephone network). For example, once the card was inserted, incoming calls to the Miami Vonage™ number would ring in Spain, i.e., they would be forwarded to a local telephony device coupled to the smart card reader. That is, the Miami Vonage™ number is actually a form of "follow-me number," but requires the user to de-install and re-install his/her desktop VoIP gateway in a new local network environment (e.g., in Costa Rica the gateway is connected via a Cable Modem, and in Spain it is connected to an office Ethernet.).

With this embodiment of the present invention, the call could be forwarded via the Internet or via the PSTN. Also, when the user makes an outbound telephone call from a telephone coupled to the smart card reader, the outbound telephone call would be charged to the user's telecommunication services account. When the user pulls the smart card out of the card reader or otherwise logs off, the service at the new location (e.g., Spain) would be discontinued. Therefore, the invention allows a user to roam from location to location and to have the full capability of a follow-me telephone number without the need to set up and activate call forwarding, use credit card calling, or to de-install and re-install VoIP hardware into different types of local network environments.

In another of its aspects, the present invention encompasses a method and system for providing portable telecommunication services. In one embodiment, this system includes one or more telecommunication servers that manage a plurality of subscriber telecommunication service accounts associated with a plurality of users. The telecommunication service accounts include a particular telecommunication service account associated with a particular user who is assigned a particular telephone number to receive incoming telephone calls. Also included in the system of this embodiment a plurality of smart cards. Each smart card is associated with a corresponding user, and each smart card includes a storage medium that preferably holds an application program that is configured to provide a set of stored information corresponding to an associated telecommunication service account. The plurality of smart cards includes a particular smart card configured to provide information corresponding to the particular telecommunication service account associated with the particular user.

The system of this embodiment also incorporates a plurality of smart card reader devices, each being coupled to a local telephony device that is operative to receive incoming telephone calls and/or to place outgoing telephone calls. The plurality of smart card reader devices includes a first smart card reader device coupled to a first telephony device and a second smart card reader coupled to a second telephony device. In a preferred mode of operation, when the particular smart card is plugged into the first smart card reader, telephone calls directed to the particular telephone number are received at the first telephony device, and when the particular smart card is plugged into the second smart card reader, telephone calls directed to the particular telephone number are received at the second telephony device.

The present invention also encompasses, in another embodiment, a similar system in which the telecommunication service account is replaced by a data and/or applications services ("D/AS") service account and the ability to receive telephone calls is replaced or augmented by the ability to receive push content. In accordance with this embodiment, the particular user can insert his/her particular smart card in first and second smart card readers associated with first and second computers, and receive pushed content at either computer depending on which card reader the particular smart card is inserted. This mechanism affords the user with true portability of data and/or applications services. Moreover, these data and/or applications services can be customized or personalized for/by each particular user, so that the user's access to and utilization of these services can be perceived as being seamless and uninterrupted, regardless of the location of the user.

In another embodiment of the present invention, which can be used with any one or more of the aforementioned embodiments, when the particular user's smart card is inserted into the first card reader, a user interface such as a GUI (graphical user interface) is presented on a first computerized device such as a computer or a smart telephone. The GUI can be customized or personalized for/by the particular user (much like a personal Web portal can be tailored to a particular user). When the smart card is inserted into the second smart card reader, the customized user interface is presented on the second computerized device. The customized GUI may include a set of application programs installed by the user together with user preferences and/or settings for one or more of the application programs and or/the desktop level interface. The device into which the smart card is placed may be loaded with the application programs either from the smart card and/or some other portable storage media, or the device may act as a thin client for running remote applications that either reside on the smart card or on a remote application server located across a communications network. In some cases, the connection to the application server may involve a secure virtual private network connection, and in some cases the application server may act as a hub in a virtual LAN (VLAN) so that the device into which the smart card is plugged may appear to be communicatively connected into a LAN to which is communicatively connected other user devices capable of receiving smart cards carried by other network users.

In addition to the above methods and systems, the present invention further encompasses many variations and features discussed in further detail hereinbelow, as well as various separate aspects, features, components, and subsystems thereof, including particular embodiments of the smart card itself, various embodiments of the methods implemented on the smart card, various embodiments of the smart card readers and their attached devices when configured to operate in the above systems, various embodiments of network servers, and various embodiments of D/AS and/or telecommunication networks that employ the system-level concepts described herein, as well as various methods for implementing the protocols and services of the aforementioned systems, subsystems, and/or components.

BRIEF DESCRIPTION OF THE FIGURES

The various novel features of the present invention are illustrated in the figures listed below and described in the detailed description which follows.

DETAILED DESCRIPTION OF PREFERRED EMBODIMENTS

Figure 1:
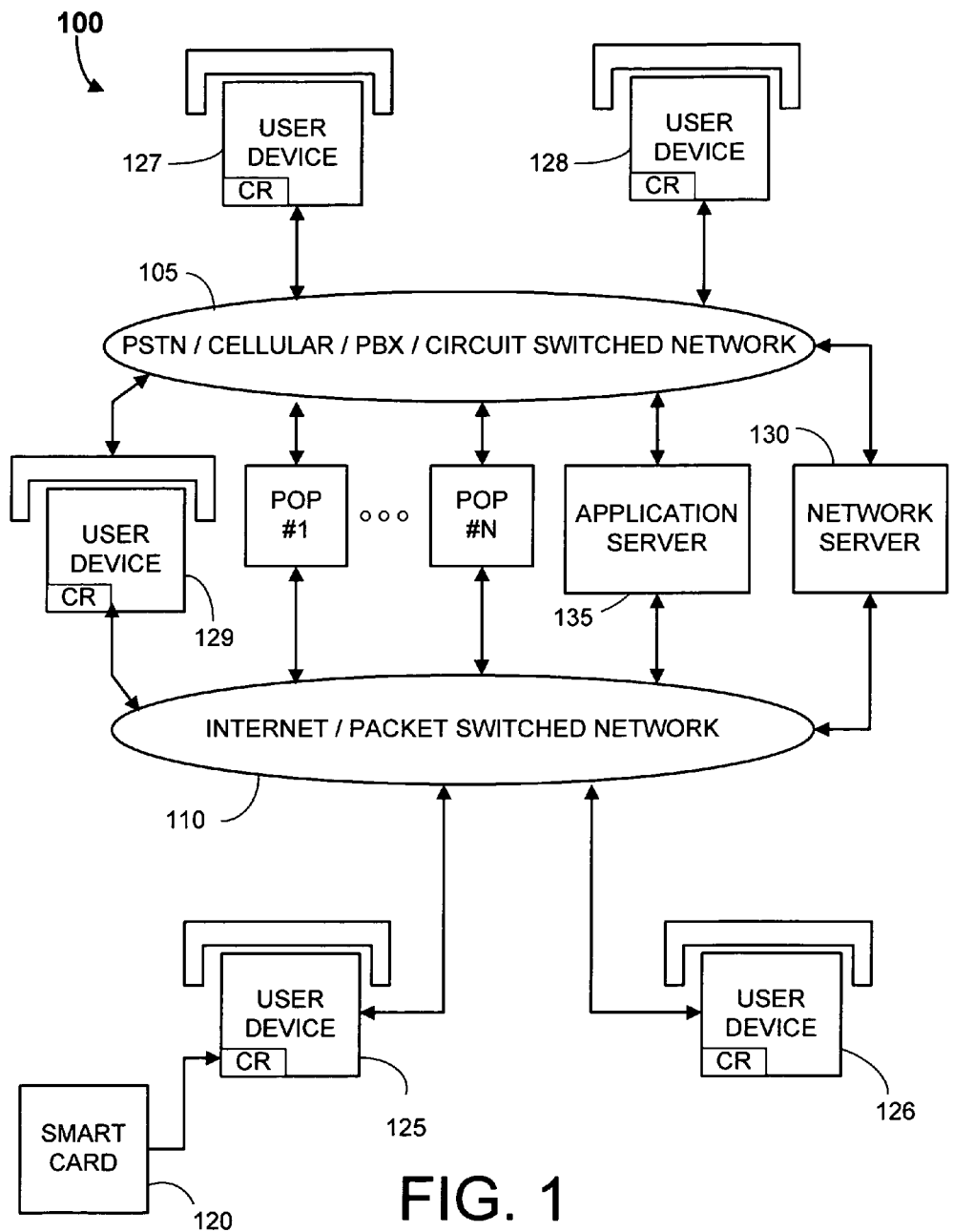
FIG. 1 is a block diagram illustrating a system for providing portable computerized and telecommunication services.

FIG. 1 is a block diagram of a network data and/or applications services (D/AS) and/or telecommunication system 100 embodying aspects and features of an embodiment of the present invention. It should be noted that the system 100 is general in nature and shows a relatively full-featured version of the system. Various components and connections may be omitted to produce different particular embodiments of the system. For example, the user device 129 and/or the application server 135 may or may not be present in a particular embodiment, and the network server 130 may only be coupled to the Internet in some embodiments. Hence it is to be understood that components and connections of the system may be omitted to arrive at specific embodiments that do not embody all the aspects of the present invention.

The system 100 preferably includes a PSTN 105. The PSTN 105 may include the standard PSTN (public switched telephone network), a cellular communications network, a wireless network such as GPRS (generalized packet radio service), WAP (wireless application protocol) networks, or other types of networks such as private circuit switched networks controlled by PBXs. In a typical embodiment, the PSTN 105 provides wireline or wireless telecommunication services such as dialed telephone calls. In this application, the PSTN may include the standard PSTN, a cellular network, a private circuit switched network, a local PBX-driven circuit switched network, or any combination or interconnection thereof. The PSTN 105 may also in some cases include other data services like SMS, MMS, WAP, pager services, and the like.

The system 100 also preferably includes a packet network 110. The packet network 110 is preferably the Internet, but may also be an intranet, a LAN, or a wireless data network such as a GPRS (generalized packet radio service) network, a WAP (wireless application protocol) based network, a proprietary or non-proprietary wide area network (WAN) or metropolitan area network (MAN), or any other bearer service that can carry application layer data. Typically the packet network 110 includes a network layer and a transport layer over which application layer data is routed. Often, the packet network 110 uses an Internet protocol, and in many embodiments the packet network 110 comprises the Internet and attached networks like mobile IP networks, GPRS, WAP, 3GPP data, etc.

A collection of POP (point of presence) devices POP #1, . . . POP #N are also preferably included. The POP devices can in some instances be built into a class 5 switch, or may be coupled thereto. In some embodiments, the POP devices POP #1, . . . POP #N are coupled to the PSTN 105 via DID (direct inward dial) telephone lines. In some embodiments, the POP devices POP #1, . . . POP #N act as VoIP (voice-over-Internet Protocol) gateways and convert PSTN voice signals to and from packet data traffic. The POP devices are preferably located in different geographical regions and incoming calls to different POPs use different area codes on the PSTN. For example, if POP #1 is located in Miami, then incoming telephone calls to POP #1 will use a Miami area code (305) while if POP #N is located in the Northern Virginia portion of the Washington D.C. metropolitan area, incoming calls to POP #N will use a (703) area code.

Using the example of the Vonage™ network, each POP would supply users of the system with local phone numbers in the area code corresponding to that POP. In the present invention, each POP may be a VoIP gateway as in the Vonage™ system, but in other embodiments, may be considered as a PSTN 105 call redirection agent. That is, in some embodiments calls can be redirected through the PSTN 105 as opposed to being routed through the Internet 110, although both types of embodiments are contemplated by the present invention.

In some systems, different POP devices may be supplied by different telecommunication services companies. In such cases, in accordance with an aspect of the present invention, a POP device controlled by a first telecommunication services company can register with a portable data and/or application services (D/AS) company and/or with another telecommunication services company to allow calls to be routed across the Internet instead of having to make multiple trips back to the PSTN, saving costs, as is discussed in further detail below.

In another embodiment of the present invention, a set of user devices 125, 126, 127, 128, and 129 are utilized. As shown, devices 125 and 126 are coupled to the packet network 110, devices 127 and 128 are coupled to the PSTN 105, and device 129 is coupled to both the PSTN 105 and the packet network 110. In some embodiments of the invention, for example, the devices 127, 128, 129 may be absent, or the devices 125, 126 may be absent, or the device 129 may be absent. The user devices 125-129 and their operation are discussed in further detail in connection with FIG. 2.

Each of the user devices 125, 126, 127, 128 and 129 include a respective card reader CR into which can be plugged a particular smart card 120 drawn from a collection of user smart cards. The smart card 120 may contain user GUI customization preferences for a particular user who owns the smart card 120, a list of or a set of application programs used by the particular user, a desktop configuration and set of user customizations and preferences, specific user device configuration parameters, special device drivers for specialized devices used by the user, and/or links to load such drivers from the Internet, and one or more addresses associated with the user. The one or more addresses associated with the user may include, for example, an application layer address associated with the user, a user email address, an address to receive push content, and/or a follow-me telephone number.

Smart card 120 also preferably holds a set of user filter data that is used to configure a telephony filter that allows incoming calls to be selectively allowed to ring through or to be blocked, forwarded to another phone number, or converted to e-mail and/or diverted to voice mail. For example, the filtering criteria or parameters can be chosen from a menu of preprogrammed selections or can be user-programmable, and the filtering can be implemented using any filtering scheme or combination of filtering schemes known in the art. For example, when traveling on a business trip a user can choose filter settings that allow forwarding of only urgent calls from particular people based upon the caller-identification data contained in incoming (forwarded) calls, and diverts all other incoming calls to voice mail. During the business trip, for example after an important business meeting is completed, the user can change the filter settings to allow forwarding of all calls from a larger set of people (or all people). Further, the user could choose different filter settings for different preprogrammed time intervals. For example, the user could choose a first set of filter settings for business hours, and a second set of filter settings for non-business hours.

Similarly, in mobile computing applications, the smart card 120 may be programmed with user filter parameters to be applied to pushed messages such as WAP protocol push messages, based upon the source (e.g., the address/identity of the sender) and/or content, title, type and/or subject matter and/or priority indication of the messages, e.g., using filter-in and/or filter-out keyword-based filters, anti-spam filters, source filters, and the like. In general, user-selectable filters are used to govern what type of pushed content is allowed to be forwarded to the user, with these filters preferably being programmable via a GUI or other user interface means. User-selectable message and content filters represent a particular type of user preference settings. Filters are generally applied to incoming telephone calls and pushed messages or content of all types, although different filters, filtering schemes, and/or filter settings, parameters, and criteria can be employed for different types of communications, e.g., SMS, MMS, IM, email, voice, push content, etc. For a review of push content filtering technologies, reference is made to U.S. Published Patent Application Number 20020160805, assigned to Nokia Corporation, the disclosure of which is incorporated herein by reference.

The smart card 120 preferably includes a memory (such as RAM, ROM, flash memory, EPROM and/or EEPROM), a processor (such as a microprocessor or a microcontroller), and a smart card interface used to transfer information via the smart card reader CR. The term smart card has been used to describe a class of credit-card-sized devices with varying capabilities: stored-value cards, contactless cards, and integrated circuit cards (ICCs). All of these cards differ in functionality from each other and from the more familiar magnetic stripe cards used by standard credit, debit, and ATM cards. It is the ICCs that are of most interest to the computer industry because these types of smart cards are able to perform more sophisticated operations, including signing (digital signatures) and cryptographic key exchange. However, it should be clearly understood that the present invention, in its broadest aspects, is not restricted to the use of smart cards, much less specific types of smart cards. Nevertheless, in many embodiments of the present invention, ICC-type smart cards are preferably employed.

In alternative embodiments of the present invention, rather than a smart card, a read-only memory card that functions primarily as a data storage medium can be used in the practice of the invention, such as a media card that stores data in a magnetic stripe and/or ROM. Other forms of memory or media cards that both store data and can be written with new information from a card reader can also be advantageously employed. More generally, the smart card 120 of the present invention can be alternatively embodied using any form or type of portable storage medium, such as a computerized user handheld device like a wirelessly coupled PDA or cell phone, an optical disc (e.g., a CD or DVD), magnetic media, holographic memory, magneto-optic media, a compact memory card (of any format), a memory stick, or any other type of portable storage medium (e.g., which connects via USB or wireless) that has the capability of storing the user-specific data that will facilitate the implementation of the present invention as described hereinafter. Presently, there exist many varieties of Universal or Multimedia Card Readers that could be suitably employed in the practice of the present invention. IN such alternative embodiments, the card reader CR is a device that can communicate with the appropriate embodiment of the smart card 120, either by direct wired coupling, wireless coupling, optical coupling, etc.

In the presently preferred embodiments, smart cards are used rather than dumb media cards. The smart card 120 communicates via a smart card interface with the smart card reader CR using a communication protocol that allows the smart card 120 to be read from and written to via the smart card reader CR. Note that the term "smart card reader" (or, more generally, "card reader") is used herein to refer to a device that typically has the capability of both reading data from and writing data to the smart card (or, more generally, other media), and thus, can be properly thought of as a card reader/writer. In general, a smart card interface consists of a predefined set of services, the protocols necessary to invoke the services, and any assumptions regarding the context of the services. Notably, Microsoft's Windows Operating System (OS) (Windows 95, Windows NT 4.0, Windows 98 and all subsequent versions, including XP) is smart card-enabled. In this connection, Microsoft has issued PC/SC (Personal Computer/Smart Card) specifications (such as the PC/SC Version 1.0 Specification, and draft Version 2.0 Specification) that all Windows-compliant computers must adhere to. Microsoft has published a white paper which states that "[s]mart cards are a key component of the public-key infrastructure that Microsoft is integrating into the Windows platform because smart cards enhance software-only solutions, such as client authentication, logon, and secure e-mail. Smart cards are essentially a point of convergence for public-key certificates and associated keys because they:

provide tamper-resistant storage for protecting private keys and other forms of personal information.

isolate security-critical computations, involving authentication, digital signatures, and key exchange from other parts of the system that do not have a need to know.

enable portability of credentials and other private information between computers at work, at home, or on the road.

The smart card will become an integral part of the Windows platform because smart cards provide new and desirable features as revolutionary to the computer industry as the introduction of the mouse or CD." (www.microsoft.com/windows2000/docs/SmartCard.doc).

The PC/SC specifications are based on the ISO 7816 standards and are compatible with both the EMV (Europay, MasterCard, and VISA) and GSM (Global System for Mobile Communications) specifications.

In one preferred embodiment of the present invention, the smart card reader CR is plugged into a USB port of a target device (such as a host computer). In this embodiment, the smart card reader is preferably compliant with the USB Chip/Smart Card Interface Devices (CCID) Specification (revision 1.0 or later) to enable the smart card reader to plug-and-play with any target device having USB/CCID Class drivers installed. Further, smart card readers can be integrated or built-into a laptop, desktop, or handheld computer, or, more generally, into any computerized device, e.g., a network (e.g., Internet, LAN, or WAN) access terminal or a VoIP desktop gateway unit ("VoIP box").

In embodiments in which the host or target device is equipped with an integrated smart card reader, the operating system and/or applications running on the host computer can access data and/or applications contained on the smart card in a manner that is seamless and transparent to the user. For example, after the user inserts the smart card, a start-up or session initiation application residing on the smart card, after appropriate protocol handshaking with the host computer operating system, could be automatically launched, after which a customized or personalized GUI could be automatically generated to enable the user to, for example, initiate a registration or log-in procedure with a remote server and/or otherwise instantiate functions and procedures encompassed by various aspects of the present invention.

For a good background discussion of smart card technology, and a detailed disclosure of particular implementations of smart cards and systems employing the same, reference is made to U.S. Pat. No. 6,213,392, issued to Zuppichich, and U.S. Pat. Nos. 6,256,690; 6,338,435; 6,390,374; and, 6,480,935, all issued to Todd Carper, the disclosures of all of which patents are incorporated herein by reference. Typically, smart cards and smart card readers conform to one or more parts of the ISO 7816 standard.

Because smart cards are well known in the art, the further details of the smart card and the specific communication protocols used to communicate with the smart card reader CR are not discussed in detail herein. Reference can be made to the extensive smart card literature and the smart card reader protocol standards for further information regarding the standard aspects of the implementation and operation of the smart card 120.

In a preferred embodiment, the smart card includes a processor coupled to memory and communicates with the card reader CR using a communication protocol. In some embodiments, the processor can run various applications or portions of applications so that a thin client may reside in a target device (e.g., a host computer) equipped with a card reader into which the smart card is inserted. In a preferred embodiment, the smart card can execute the smart card communication protocol, which is often implemented as a protocol stack. Also, the smart card can run various application programs that can each communicate via the card reader with a target device (or host application) using the protocol stack. In some embodiments, the smart card can advantageously be configured with a true operating system, and a memory management and protection unit such as that employed in Infineon's SLE 66CX642P smart card.

Also included in the system 100 is an optional network server 130. Depending on the embodiment, the network server may be connected to the PSTN 105, the packet network 110, or to both. In practice, the network server 130 may be implemented as one or more physical computerized server devices located in one or more geographical areas. The network server is discussed in further detail in connection with FIG. 3. The network server is used to allow the user devices 125-129 to register the event that the smart card 120 belonging to the particular user has been plugged into the respective card reader CR. When this event occurs, the user device performs a registration operation or log-in procedure so that incoming messages (e.g., telephone calls, or pushed content in general) received for the particular user are redirected to the current location of the particular user, i.e., the user device into whose card reader the smart card 120 is plugged, and/or a local telephony device coupled thereto or integrated thereinto.

As part of the registration or log-in procedure, in some embodiments, the user is given the option of adjusting his/her preferences, settings, configurations, etc., such as, for example, the user's filter settings, announcement/greeting, auto-reply message, contracted or desired level of QOS (telecommunications quality of service), and/or other parameters. For example, when the user is on vacation the user could change the filter settings to divert all but the most urgent calls to voice mail, could record an announcement/greeting that informs the diverted callers that the user is on vacation, and/or could establish an auto-reply message that informs the recipients thereof that the user is on vacation.

Although not limiting to the present invention, it is preferable that the registration or log-in procedure be transacted over a secure communications channel. In this regard, although the present invention contemplates embodiments that do not involve the use of a smart card, in the presently preferred embodiments, smart cards are advantageously utilized to enable establishment of a secure communications channel between the target device to which the smart reader is attached (the "client"), and the remote server. Client authentication involves identification and validation of a client to a server to establish a secure communications channel. A secure protocol, such as Secure Sockets Layer (SSL) or Transport Layer Security (TLS), is typically used in conjunction with a trusted public-key certificate provided by the client that identifies the client to the server. The client could be the Internet Explorer running on a Windows platform, and the server could be an Internet Information Server (or some other Web server that supports SSL/TLS).

The secure session is established using public-key authentication with key exchange to derive a unique session key that can then be used to ensure data integrity and confidentiality throughout the session. Additional authentication can be achieved by mapping the certificate to a user or group account with previously established access-control privileges. The smart card enhances the public-key authentication process by serving as a secure store for the private-key material and as a cryptographic engine for performing a digital signature or key-exchange operation.

In the past, interactive logon has meant the ability to authenticate a user to a network, using a form of shared credential, such as a hashed password. Windows 2000 and later versions of the Windows OS support public-key interactive logon, using a X.509 version 3 certificate stored on a smart card along with the private key. Instead of a password, the user inputs a Personal Identification Number (PIN) to the Graphical Identification and Authentication (GINA); the PIN is used to authenticate the user to the card.

The user's public-key certificate is retrieved from the smart card through a secure process and verified to be valid and from a trusted issuer. During the authentication process, a challenge, based on the public key contained in the certificate, is issued to the card to verify that the card is indeed in possession of and can successfully use the corresponding private key. After successful verification of the public-private key pair, the user's identity contained in the certificate is used to reference the user object stored in the Active Directory to build a token and return a Ticket-Granting Ticket (TGT) to the client. Public key logon has been integrated with the Microsoft implementation of Kerberos version 5 that is compatible with the public-key extension specified in the IETF draft RFC-1510.

The smart card also provides the additional advantage that it can be used to send and receive e-mail messages in a secure manner, thereby allowing users to share information confidentially and to trust that the integrity of the information was maintained during transit. Using Microsoft Outlook™ Express or Outlook 98, or subsequent versions thereof, a user can select a public-key certificate issued by a trusted certificate authority to use for digitally signing and decrypting secure messages. By publishing the user's certificate to a public directory in the enterprise or on the Internet, other users within a company or on the Internet can send encrypted e-mail to the user, and vice-versa.

A smart card (or an equivalent type device as discussed above) adds a level of integrity to secure e-mail applications because it stores the private key on the card, protected by a PIN. In order to compromise the private key and send signed e-mail as someone else, someone would have to obtain the user's smart card and the PIN. The PIN could someday be replaced with a biometric template of the user's fingerprint, thus enhancing the nonrepudiation aspects of digitally signed e-mail.

Another aspect of the system involves the optional application server 135. Depending on the embodiment, the application server may be connected to the PSTN 105, the packet network 110, or to both.

The application server 135 may be used in different embodiments for various reasons. For example, the application server may act as an application services provider (ASP) so that the user devices 125-129 need not be loaded with all possible applications used by all possible users who may insert a smart card into the respective card reader CR. That is, when the smart card 120 is plugged into the respective reader CR, the user device may then load or already have installed thin client code, and the application server may run remote application programs for the user. For example, the application server 135 could include file storage for the user and thereby act as a virtual laptop or desktop environment for the user, holding word processor, calendar, e-mail client, PIM (Personal Information Manager), and spreadsheet programs as well as associated word processor, calendar, e-mail client, PIM, and spreadsheet files for the user. In this manner, the user could plug his/her smart card into the card reader CR of one of the user devices 125-129 located, for example, in a hotel room, a friend's house, or at a remote office. In any of these cases, the user would see the identical user interface and have access to the same set of programs and data files as if he/she were at home working on his/her desktop or laptop computer. In essence, it is transparent to the user that he/she is actually a guest/visitor on a third-party's computer.

The application server may also be a gateway to a secured intranet, in which embodiment, the user could set up a VPN (virtual private network) link to gain access thereto. In such an embodiment, the smart card 120 provides authentication and encryption and/or other user-specific data needed to set up the VPN link. Similarly, the application server could serve as a network hub for a VLAN (virtual LAN). In this manner, a remote user who plugs his/her smart card 120 into one of the user devices 125-129 would appear to be connected to a LAN, as if he/she were directly connected into a local Ethernet.

It should be appreciated that the smart card 120 may also function similarly to the application server 135. That is, instead of using the remote application server 135 to execute user applications on behalf of the thin client user devices 125-129, a multiple application smart card can suitably be employed to perform at least some of the same (or similar) functions as the application sever 135 as previously described.

The operation of the system 100 will be described subsequently in connection with FIGS. 2-4 and a system level discussion to follow the description of each of the individual figures.

Figure 2:
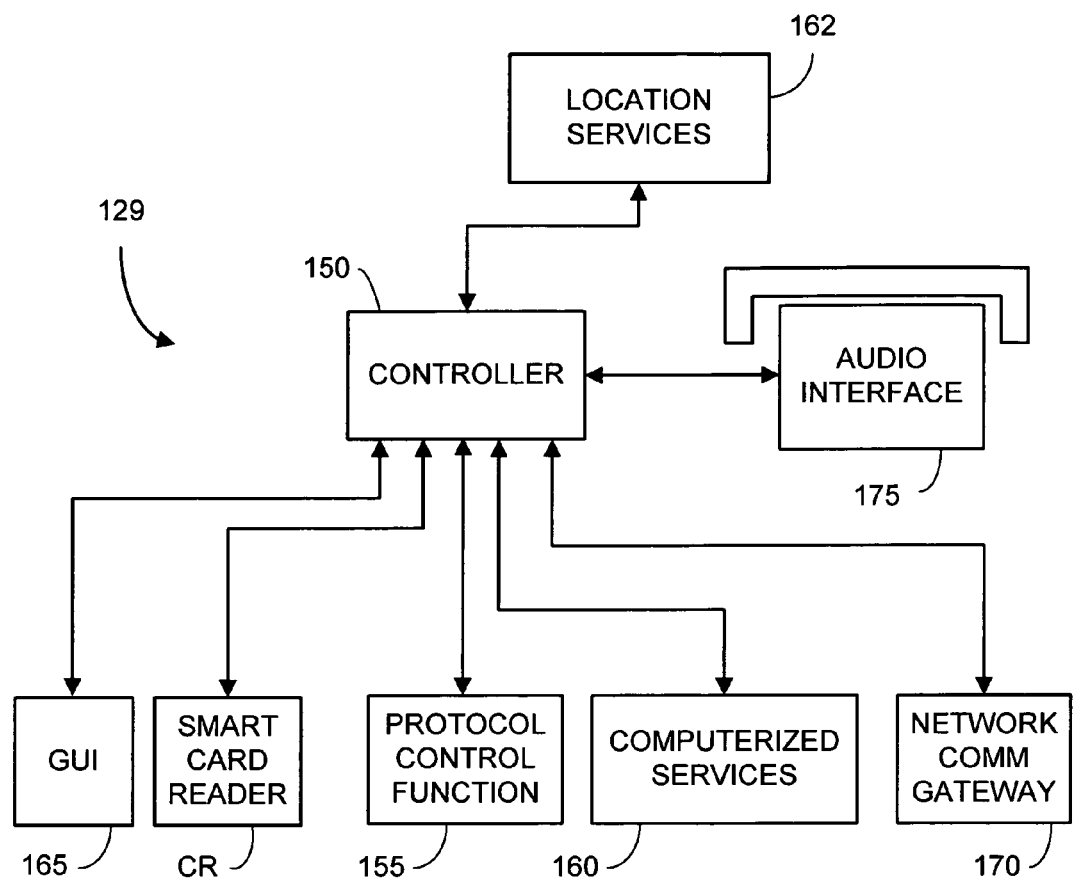
FIG. 2 is a block diagram representing an embodiment of user device that supports potable computing and telecommunications in accordance with aspects of the present invention.

Referring now to FIG. 2, the user device 129 is shown in greater detail. The user devices 125-128 are implemented similarly to the user device 129, except only have a connection to one of the PSTN 105 or the packet network 110, so the discussion of user device 129 is used to explain the operation of all the user devices 125-129. That is, if certain connections are omitted from the more general user device 129, then one of the specific implementations of the user devices 125-128 results.

A first element of the user device 129 is the card reader CR. The card reader CR, as discussed previously, uses a standard smart card connector protocol and a standard smart card communications protocol to communicate with the smart card 120 associated with the particular user. The card reader CR is coupled to a controller function 150. The controller function 150 is typically implemented as a software program that resides in memory and runs on a processor, although other embodiments, such as embodiments utilizing custom or semi-custom semiconductor circuits, specialized ASICs or FPGAs are contemplated.

The controller function 150 is operative to cause the smart card to be read and to cause various method steps (e.g. 210, 215, 220, 225, 230, and parts of 235, 240 of FIG. 4) to be executed. In general, the majority of the actions, procedures, and functions described herein that are performed by the user device 129 are orchestrated and controlled by the controller function 150.

The controller function 150 is coupled to a module 155 that includes one or more protocol functions. For example, one protocol function is implemented to communicate with the smart card 120 when it is plugged into the card reader CR. Another protocol function is used to communicate with the network server 130 to register information contained on the smart card 120 that has been inserted into the card reader CR. In some embodiments, the user will also need to enter a password to cause the user device 129 to enter a mode whereby the registration protocol is initiated with the network server 130.

Another set of protocols may be present to interface with the application programs which may reside on the application server 135 and/or the smart card 120 and/or the host or target device (such as a computer).

Another module, computerized services 160, is also optionally present. This module may provide certain applications, drivers, links to drivers, servlets, and/or applets, and/or a generalized thin client interface to remote applications such as ones that execute on the application server 130 and/or the smart card 120 and/or the host or target device. In an aspect of the present invention, some remote applications are partitioned to execute on three platforms, the user device 129, the remote application server 130, and the smart card 120. In general, various software components pertaining to one or more applications can be distributed across multiple computing platforms, such as, for example, one or more remote servers, a local host computer, a smart card, and other devices that could be coupled to or integrated into one or more of the other computing platforms. Such distributed software components can be mediated locally and/or remotely by one or more mediator modules developed using Microsoft .NET software development tools, for example.

Another optional aspect of the invention is to augment the user device 129 (or user devices 125-126) with a location services module 162. The location services module 162 provides an indication of the geographical location of the user device. In one embodiment, the location services device is implemented with a GPS receiver or other location identification device. In such embodiments, the user device 129 can report its physical location during a registration process. This way, when the user plugs in his/her smart card or uses a web site based registration procedure, so that his/her telephone number, other type of push content address, and/or personal preferences are registered as being associated with the user device 129, the network server 130 and/or the application server 135 may know the physical location of the user. This way, for example, if the user makes a 911 call, the system may ensure a local 911 service is able to respond to the call. In prior art systems, for example, if a user made a 911 call from a VoIP box such as a Vonage™ box, there was no way to connect the call to the appropriate 911 service. For example, in the present invention, a Vonage™ type box would be equipped with a GPS receiver, and whenever a user plugged the box into the Internet, the network server 130 would be automatically notified of the user's physical location (e.g., physical address and/or GPS coordinates), and would ensure the call is routed to the appropriate local 911 service and would provide the 911 service with the physical location of the user device from which the 911 call was made.

It should be further noted that the location services module 162 need not be implemented using a GPS receiver or other location identification device. Other methods would include manual entry. Another method would be for the network server 130 (or any other network server) to keep a table that maps internet addresses to physical addresses. For example, a particular cable modem subscriber's location would be known by the cable modem service provider, as would the physical address of a DSL or dial up modem subscriber be known to the service provider providing telephone access. Likewise, a campus intranet could include geographical configuration data in tables. In such cases, buildings and office numbers would be associated with Internet or LAN addresses. Hence a more general aspect of the present invention is to provide the location services module 162 either in the user device (any of the user devices 125-129, to include desktop VoIP gateways, etc.) or a device coupled thereto, and/or to include physical location tables at a network server such as the server 130 or 135 or the router 190, etc. When the physical location mappings are available, local services like 911 can be made available to a VoIP user. Other local services like local telephone operators or local directory assistance operators can also be reached by mapping short dialed patterns to local service numbers.

In an alternative type embodiment, the smart card 120 (or equivalent device as discussed above) itself carries a GPS or other type of location identification device. This way, when the user connects the smart card 120 to the card reader CR, the user's location information is guaranteed to be available. In such embodiments, the smart card 120 causes the appropriate geo-coordinates to be coupled to the network, and all the location based services described herein may be used. The network needs to be programmed in accordance with the location based services aspects of the present invention in order to recognize the supplied geo-coordinates and to route local calls and provide ordering information appropriately.

In another aspect of the invention, a user could use the physical location mapping for other reasons than 911 calls. For example, suppose the particular user liked to order pizzas from Dominos™ Pizza. The user could have a user preference configured to dial the closest Dominos™ Pizza. For example, the user could dial "912", and this would mean "dial the closest Dominos™ Pizza restaurant." If a different user also liked Pizza, but liked Chicago style deep dish pizza, he/she might use 912 to mean "send my position to a local recommendation service, and ring the recommended best restaurant that delivers deep dish pizza closest to my present location." Of course, if the device 125 also had a GUI, such services could be presented in graphical form and the user could have a more sophisticated set of user preferences, to include lists of different types of local services of interest to the user. This might include the nearest laundry service, a recommended Thai restaurant, a recommended sushi bar, etc. The user could then select a given category in his preference list, and cause the phone to be speed dialed to the appropriate local service or merchant, or could connect via the Internet to place an order directly via the GUI. Similarly, the user could get directions, for example, for getting to the recommended best sushi bar in the area from the user device into which the user plugged his smart card, such as from his/her hotel room, or from a public pay phone with the smart card service.

In embodiments where the user device, e.g., 129 provides a GUI, the location based services may also be used to place orders and interact with businesses and other individuals. For example, suppose a user is on the road and cannot give directions to his current location. If a GUI is available, the location based service may be used to not only identify the nearest point of presence like a selected Pizza shop, but may also allow the user to forward his/her location information to the pizza shop so the pizza shop could deliver the pizza to the user's location. Hence the present invention allows a user to identify the telephone number or local computer contact number of a local service and also to communicate his/her location to the local service so the local service can dispatch local service personnel to the user's location.

This feature is needed in the 911 calls as well. The present invention allows the local 911 service center to be identified in the outbound call by taking note of the user's location and routing the call to a POP in the local 911 area, for example. The present invention also allows the user's location to be transferred to the 911 service so that an emergency services vehicle can be dispatched to the user's location. In one embodiment, the user's location information may be transmitted via computer communications to identified local 911 service. Alternatively, the communication server 135 may insert into a caller-ID packet a local telephone number corresponding to telephone at the same physical address as the user device from which a VoIP 911 call was made. Alternatively, the communication server 135 may insert into a caller-ID packet a set of geo-coordinates (e.g., GPS) or other location identifying information (e.g., university campus identifier, building name, and office number) so that the recipient 911 service may identify the location of the caller. Other embodiments make use of intelligent network signaling protocols to cause the user's location information to be sent to the local 911 service via the intelligent network services provided by the PSTN network.

It is contemplated by one embodiment of the present invention that future 911 service will be augmented to include both incoming phone lines and incoming computer server connections. When a VoIP caller needs to make a 911 call, the user's location information is taken into account as discussed above. The user's location information is then used to determine the appropriate local 911 service. The network server 130 then forwards the call to the local 911 service. In this type of embodiment, the network server 130 also identifies a server address for the 911 service. The network server (or the application server 135) then causes to be forwarded to the 911 service's server computer information such as the street address of the caller, or the GPS coordinates, or any other suitable location identifier. In such embodiments, the standard caller-ID information corresponding to the user's follow-me number may be forwarded to the 911 service, and the computer communication call to the 911-server can supply the both the user's follow-me phone number and the user's physical coordinates. Thus the 911-controlled computer can use the caller-ID information to associate a particular call with the user's physical location. This way the dispatcher can send the emergency vehicle to the proper location without delay. Hence the invention allows both the local service to be identified and allows the user's location to be provided to the local service.

It is also contemplated that the above method of making a call, identifying a local service, forwarding the call to the local service, supplying the caller ID information of the user's follow me number via caller ID to the local service, and by table look up, identifying an associated local service server network address then making a separate computer communications call to the local service's server and providing the user's location may be used in commercial applications as well. For example, to order a pizza, the user dials 912, connects to his/her desired type of pizza parlor, orders a pizza, and the pizza parlor has all the address information it needs to send out the order. This can be helpful in ordering groceries, requesting curriers, etc., from locations whose physical or street addresses may not be well known to the user due to mobility concerns, or may more generally be used to help VoIP users place orders without the need to give detaile4d directions, etc.

As discussed above, when a user makes a call, his caller ID information will typically identify the portable follow-me number from which the call is made as opposed to the user device 129. This allows a call recipient to see the user's caller identification as opposed to an unknown pay phone or third party's phone information. In VoIP, this is the only caller-ID number that is currently available at all. However, in the case of a 911 call or more generally an outbound call where a local provider will use caller ID or ANI (automatic number identification) information to map a user's calling number to a physical location, unless the previously discussed technique is applied, this may cause the responding service's computer to become confused. Hence in another aspect of the invention, the user device, e.g., 129, provides both the user's follow-me number for standard caller-ID service, but also provides at least one of the user device 129's caller-ID/ANI data, and/or the location information associated with the user or the user device. This added information allows a local receiving entity like a 911 service to know the location of the calling party. Extension fields in the caller-ID packet protocol are used to carry the information so a separate call to an associated server is not needed. This technique is also useful in other applications such as local commercial applications as discussed above.

In another embodiment, depending on the dialed number, one of either the user's follow-me number or the user device's caller ID information or location information is provided. For example, when a call is made, the outgoing number is compared to stored numbers in a table. If the outgoing number matches a table entry, the caller-ID/ANI data of the user device (e.g., 129) is provided. For example, the 911 or 912 numbers would be stored to provide the local caller ID data. All other calls would use the caller ID information of the follow-me number. In an optional embodiment of this aspect of the invention, the user's geo-coordinates are transferred in a caller-ID packet, either additionally, or in lieu of the local telephone number of the user device (e.g., 129). The table is used to determine whether the caller-ID information should provide the user's follow-me number or other information used to allow the call-receiving party to know the caller's physical location.

Hence the location services module 162, a geo-locator on the smart card 120, or a physical location mapping table allows the user to configure general user preferences for local services. Depending on where the user has plugged in his/her smart card or otherwise registered via a web site that holds his/her preferences, the system will recognize the user's current location and will associate any subset of user preferences that involve local physical points of service to local merchants, 911 service, and the like. In such embodiments, an aspect of the invention is a recommendation service that provides recommendations of the best local merchants, although it is also contemplated that merchants might pay a fee to receive a higher place in the recommendation list, as a form of advertising.

In an exemplary embodiment, the user device 129 executes a standard thin client interface, the application server 130 implements, for example, file storage and some of the more memory/computationally intensive functions of the application, and the smart card 120 implements user interface functions so that the bulk of keystroke and mouse clicking interactions are processed locally, and network interactions with the application server 135 are needed less frequently and can be handled in larger bulk transfers. In other embodiments, the user device 129 runs thin client software, the application server 130 performs application and data processing, and the smart card performs certain subtasks on highly sensitive data to which the server 130 is not granted access. This is another example of how an application program on a smart card and a remote application program running on the application server 130 can work together with a thin client to jointly execute an application level task.

Another module on the user device 129 is the optional GUI 165. The GUI 165 is typically used in embodiments in which data and/or application services (D/AS) are provided or in which a smart phone user interface is provided to enable access to such features or functions as automatic dialing from an address list, as is common with cellular telephones. The GUI provides the user with a means to interact with the user device 129 and can include a Windows style interface, a mouse, a touch-screen, etc. In a preferred embodiment, the GUI is customized in accordance with the particular user's configurations, preferences, settings, and selections of application programs. That is, when the particular user plugs in his/her smart card 120, the GUI is customized to present a desktop interface to the user that is consistent with all customizations and configurations made by the user previously, to thereby present the user with a seamless, personalized user interface.

The user's loaded programs will be accessible via the GUI, all the user's desktop shortcuts will be available, and other user preferences, key mappings, natural language, menu bars and the like will be configured in accordance with the user's previously established settings. To support telephony applications, the user's active call list is preferably made available so the user can select stored contact names instead of having to remember and dial telephone numbers. Similar address information such as email address books and instant messaging buddy lists can also be loaded from the smart card 120 and made available to individual applications in the user device 129, depending on the embodiment.

Another use of the smart card is to configure device drivers and other lower level drivers under the control of an operating system running on any the user devices 125-129. For example, consider the user device 129. Suppose the user has a digital video camera or some other type of specialized equipment. Typically, when the user buys such equipment, he/she inserts a CD into his/her computer to load any application programs needed to interface with the equipment, but also may load a set of device drivers to interact with the equipment. Often, the exact set of device drivers loaded depends on the computer into which they are being loaded. For example, different drivers may be needed depending on whether the machine runs an operating system such as Windows™, Linux™, Solaris™, or Macintosh™. In some cases different drivers may be needed for different versions of an operating system, for example, Windows™ or Windows XP™. Also, certain machines running Windows may use different drivers depending on the processor used, or other items like graphics chip sets and the like.

In prior art systems, either a user needs to load a set of device drivers from a disk, or else a wizard indicates that an unrecognized device has been inserted (e.g., hot plugged), and asks the user if he/she would like to load the appropriate drivers from the Internet. In such a case, the appropriate drivers for the given machine are loaded to support the new device which has been plugged into the machine. In accordance with an aspect of the present invention, the user's specialized device information is stored on the smart card 120. When the smart card is inserted into or otherwise coupled to a device like the user device 129, the appropriate drivers are automatically loaded, or, when the unrecognized device is inserted into the user device 129 (e.g., USB hot plugged into the user device 129), the appropriate drivers are automatically loaded for the specialized device to match the particular system configuration of the user device 129. In embodiments where a user does not carry a smart card, but logs into a web site that holds all the user configuration and mobility information in a database, the same functionality may be implemented in accordance with the present invention as well.

Another component of the user device 129 is the network communications gateway 170. In the user device 129, the network communications gateway 170 preferably comprises an RJ-45 connector to an Ethernet, a wireless LAN connector such as an 802.11 protocol connector (e.g., 802.11(a), (b) and/or (g)), or some other type of network connector (e.g., a T1 telephone line) for coupling to the packet network 110. Typically the packet network 110 is the Internet or is a network such as a mobile/wireless packet data network that is coupled, sometimes indirectly, to the Internet. Another connector present in the user device 129 is a connection to a PSTN 105, and this may include an RJ-11 connector, a T1 line interface connector, an ISDN line connector, a wireless cellular subscriber air interface connector, etc. The user devices 125, 126 include the connection to the packet network 110, but not the additional connection to the PSTN. Such user devices 125, 126 may still include the RJ-11 connector, however, not for plugging into the PSTN 105, but rather, for plugging into an external standard telephone. The user devices 127, 128 include the connector to the PSTN 105 but lack the connector to the packet network 110 (e.g., Internet).

An optional component of the user device 129 is telephony audio interface 175. This can be built directly into the user device 129 (e.g., when the user device is a hand-held device like a cell phone), may be a handset or headset attached to the user device 129, or may be, more generally, any type of telephony audio interface including an audio input means (e.g., a microphone) and an audio output means (e.g., an earpiece or speaker). As discussed previously, in some embodiments, an RJ-11 connector is supplied in order to connect a standard external telephone to be used as the audio interface. In such embodiments, the audio interface 175 is typically not present in the user device 129, although this is not limiting to the present invention. The RJ-11 jack can be used to plug in a standard wireline phone or a base unit of a cordless phone, for example. In another embodiment, the user device 129 may itself act as a cordless base station and the telephony audio interface 175 may be implemented as a wireless handset or headset.

It should be appreciated that any of the user devices 125-129 may in fact support multiple users. For example, the user device 129 may be implemented as a multi-station device with replications of the card reader CR, the GUI 165, and/or the telephony audio interface 175. In such embodiments, the network communications gateway might incorporate an RJ-45 connector coupled, for example, to a router, a DSL modem, a cable modem, a T1 line coupled to an external router, etc. The telephony interface of the network communications gateway 170 would typically include a DID (direct inward dial) line such as a T1 line so that individual stations would appear as extensions to a PBX-like multi-user telephony interface. All such single user and multi-user embodiments are contemplated by FIG. 2.

The user device 129 may be used in various types of configurations. For example, consider a stand-alone smart pay phone (single-user embodiment) or a bay of smart pay phones (multi-user embodiment) such as would be found at an airport or other public place. Realizing that both types of embodiments are contemplated, for clarity, but without loss of generality, the following discussion focuses on a single user smart pay phone embodiment. In such an embodiment, the particular user walks up to the smart pay phone and inserts the smart card 120 into the card reader CR. At this time, the protocol control function 155 implements a smart card communications protocol in order to communicate with the smart card 120. The smart card 120 passes a set of data such as user authentication data, encryption codes, user configuration data, application preferences, and a set of telephony services account identification information and possibly application services account information to the user device 129 (in this case, a single-user smart pay phone). The controller then performs any needed local registration and presents a customized GUI to the user. It should be appreciated that the customized GUI is an optional feature of the present invention, and further, that only one of or both of D/AS or telephony services may be provided in a specific embodiment.

Next, the user device 129 preferably uses the connection to the packet network 110 and/or the connection to the PSTN 105 in order to register with the network server 130. In this type of optional embodiment, the network server, as discussed in further detail in connection with FIG. 3, causes incoming communications such as pushed messages and incoming telephone calls directed to the particular user to be redirected to the user device 129. If applicable, the protocol control function 155 also causes the user device 129 to register with the application server 135. Once registered, the user can interact with his/her standard GUI and access his/her application programs and data using his/her own user-customized desktop interface and user-customized application program configuration settings and preferences. Moreover, the user can place outbound telephone calls and have the calls billed to his/her normal telecommunications services account. The user can also receive incoming calls that acquaintances and associates place to his/her telephone number. For example, if the user is in a hotel room in New Jersey, and a friend dials his/her follow-me telephone number in the 305 area code, the call is received at POP #1 but is redirected across the PSTN 105 or the packet network 110 (depending on the embodiment) to the user device 129. If the next day, the user travels back to Costa Rica and stops in the Miami airport, when he/she now inserts the smart card 120 into a user station in multi-user bay 129 of telephone stations, he/she can again receive incoming calls, use his/her computer applications, and/or make outgoing calls, having them billed to his/her normal telecommunication services account. The user device in the airport may also add a charge for using the user device 129 supplied by the airport. This charge would preferably be billed directly to the same user account used to support the rest of the telecommunication services to the user provided by the system 100, and/or paid for using a credit card and/or "electronic cash" which could also be resident on the smart card.

The user devices 125, 126 operate similarly to the user device 129. For example, the user device 125 can provide or include some or all of the features discussed above; however, because the connection to the PSTN 105 is not present, all calls in this particular embodiment are received via the packet network 110 (e.g., the Internet). In such an embodiment, the network communication gateway 170 includes a VoIP gateway to enable the user to make telephone calls as though connected to the PSTN, i.e., the incoming call at POP #1 is routed across the packet network 110 and causes the telephony audio interface 175 to ring to signal the presence of an incoming call. Optionally, if an external standard telephone is plugged into a local RJ-11 jack, the standard external telephone will ring and the particular user will be able to communicate (preferably, both inbound and outbound calls) using the standard external telephone as if connected to the PSTN 105.

The aforementioned embodiment of the user devices 125, 126 is particularly advantageous because a standard user device like a laptop computer, a desktop computer, a workstation, or a desktop VoIP gateway (such as supplied by Vonage, Inc.) can be designed to include an integrated smart and/or media card reader CR. For example, suppose user A owns a laptop computer that is plugged into the Internet via a DSL connection or via a cable modem connection using an RJ-45 cable. Now assume the particular user wishes to borrow user A's computer. To do so, he/she inserts his/her smart card 120 (or couples some other supported card format, wireless PDA, smart cell phone, etc.) into the integrated card reader CR, and user A's laptop becomes configured and customized as though it belonged to the particular user. In other words, user A's laptop is instantly personalized to the particular user who is borrowing it.

Likewise, suppose user A has a desktop VoIP gateway ("VoIP box") such as supplied by Vonage™. Suppose user A is in the 703 area code and incoming calls to user A are received at POP #N. Calls received at POP #N directed to user A's phone number then cause the telephony audio interface 170 of user device 125 to ring. When the particular user inserts his/her smart card into the card reader CR of the user device 125, calls received at POP #1 for the particular user now ring through to the user device 125 instead of (or in addition to) calls for user A. In one particular implementation of this embodiment, user A first de-registers, and then the particular user registers with the user device 125 back to the network server 130. Alternatively, both user A and user B can both be registered, and an indication of which telephone number (and/or person) each incoming call is directed to can be displayed on a local display attached to the VoIP box, the user device 125, and/or an external display device coupled to the VoIP box and/or the user device 125. Preferably, if multiple users are receiving calls at the same VoIP box, each user can be assigned a distinctive ring signal so that the appropriate user can respond to the incoming call by picking up. Likewise, in another aspect of the present invention, if a single user can receive calls at a single VoIP box from multiple POPs, (e.g., the particular user can receive calls from both the 305 and 703 area codes), then distinctive rings can be programmed for each POP so the particular user can tell from the ring signal from which area code an incoming call originated.

In accordance with another aspect of the present invention, rather than the various components of the various embodiments discussed herein being interconnected or coupled together by wired and/or wireless coupling means, these various components, e.g., the VoIP desktop gateway, the computer, the smart card and/or media card reader, a local telephony device, and/or a broadband network access device (e.g., a DSL or cable modem and/or computing device incorporating the same) can be integrated into one or more housings ("boxes"). For example, a single box could include all of the components required to provide "follow-me" VoIP service at such locations as airports, building lobbies, hotel lobbies, hotel rooms, office facilities (e.g., visitor offices, conference rooms, etc.), train stations, subway stations, bus stations, etc. Alternatively, various ones of these components could be selectively combined and/or simply pre-bundled to facilitate easy and inexpensive installation and set-up. In general, much of the infrastructure that will be required to proliferate such a "follow-me" VoIP service is already in place. The additional infrastructure required to deliver this type of service can be deployed by integrating or combining the additional components required into one or more of the components that are already installed in the locations where this type of service would be beneficial, and/or by tightly bundling these components to enable them to be easily plugged-into or operatively coupled to the existing components that are already in place.

The user devices 127, 128 operate similarly to the user device 129. For example, the user device 127 can provide or include some or all of the features discussed above in connection with the user device 129; however, because the connection to the Internet 110 is not present, in this embodiment, all calls are received via the PSTN 105. The protocol control function 115 also causes the user device to communicate with the network server 130 via the PSTN 105. Such embodiments typically do not include a connection to the application server 135, although it is possible to communicate with the application server 135 via the PSTN 105.

In such an embodiment of the user device 128, an incoming call at POP #1 is routed across the PSTN 105 and causes the telephony audio interface 175 to ring to signal the presence of an incoming call. The user can both accept incoming calls and make outbound calls. If present, the GUI is preferably customized in accordance with the user's personal preferences and customizations. In such an embodiment, when the user plugs his/her smart card into a telephony device, he/she commandeers the device as if it were his/her own so he/she can accept and place telephone calls as though he/she were using his/her wireline or cellular telephone. In such an embodiment, no connection to a packet network such as the Internet is required, as all communication, to include registration, deregistration and other protocol handshaking with the network server (and the application server, if used), occurs over the PSTN 105. In essence, the smart card 120 and any of the user devices 127-129 may interact with the PSTN 105 to cause call forwarding to be turned on. This may be done by interacting with nodes (such as service access points and service control points) of the intelligent network, for example.

While most embodiments discussed herein focus on systems involving the smart card 120 plugged into the card reader CR, other variations are possible. In this application, every time it is mentioned that the smart card 120 is plugged into the card reader CR, it should be recognized that in alternative embodiments, the coupling of the smart card to the smart card reader can instead be achieved via a wireless coupling. That is, for example, a laptop with a wireless USB interface, an 802.11 wireless LAN interface, a Bluetooth interface, or any other type of wireless interface, may be used as a lower layer bearer to support the communication protocol used by the smart card 120 to communicate with the card reader CR. With such embodiments, the smart card communication protocol is layered over the wireless protocol of choice. The net result is a user with a wireless or contactless smart card need not physically insert the smart card 120 into the card reader CR for any of the systems in this application to be implemented or for any of the methods discussed in this application to be carried out.

Another general aspect of the present invention is that additional embodiments of the invention may be realized by omitting the smart card 120, by way of the user instead logging into the network server 130 or the application server 135 using a network access device or terminal, such as a desktop or laptop computer, or other computerized device, e.g., by entering a set of user authentication data similar to what is stored in the smart card 120 in previously described embodiments. In such remote log-in embodiments, the user would enter a user name and a password via a web site GUI, and the rest of the information that would normally be stored on the smart card 120 would be stored in a database collocated with the server 130 or 135 and/or supplied by an application installed on the computerized device employed by the user to log-in to the remote network server 130, e.g., a VoIP "follow me" service provider application installed on a hotel or corporate facility "guest" computer.

For example, suppose the particular user travels to a hotel, and in the hotel is a computer terminal and a VoIP telephone or gateway. Of course, the VoIP telephone and/or gateway could be integrated into the computer terminal (or, other network access device). The computer terminal and the VoIP telephone or gateway would take the place of the user device 125. In such an embodiment, a single computerized device like the user device 125 may be used, or a VoIP desktop unit or box, like a Vonage™ desktop gateway, may be co-located on the same LAN as a separate computer like a desktop or laptop. In such a system, the computer preferably includes software (e.g., a software driver) to identify the Internet address of the VoIP desktop gateway, and the user logs into the VoIP service provider web site (network server) and enters his/her user name and password and/or other user-specific information required to establish a communications session between the VoIP desktop gateway and/or host computer and the remote network server. Preferably, a set of local terminal information (e.g., a "terminal cookie") is automatically uploaded to the server 130 or 135 to associate the VoIP desktop gateway with the user's account. Hence, for example, when a telephone call is received at POP #1 for the user, the local VoIP desktop gateway will cause a local telephone to ring. When the user makes outbound calls, the calls will be billed to the user's account, if charges apply. Of course, if these "follow me" VoIP services are included in the user's normal monthly bill for no extra charge, or even if the user is charged significantly less than the tariffs normally charged by hotels, airports, and long-distance carriers for pay or credit card phone calls, then the economic model or business case for such a service is quite compelling.

The above-described remote log-in procedure may also be used in place of smart card registration procedures in any of the other embodiments of the present invention that involve the use of smart cards, to thereby dispense with the need for smart cards, potentially at the cost of a decreased level of security and quality of service and other benefits and advantages afforded by smart cards, as discussed above. However, in some applications, it may be found that the benefits and advantages provided by the use of smart cards are either minimal or outweighed by the added convenience and potentially lower infrastructure cost requirements of a "cardless" log-in procedure. For example, any of the embodiments of the present invention that utilize smart card based registration protocols may be replaced by a protocol whereby a user logs into a service provider web site (remote server facility). In these embodiments, a server side database is optionally used to store user-specific information (e.g., user-specific billing and account information, user-specific authentication data, and the like) depending upon the level of access security desired, for example, and local IP address information is preferably automatically uploaded to the web site, via direct user text entry, via cookies, via a plug-in, via a Java script and/or via other executable code to transfer data providing the remote server with the Internet address to be used to forward telephone calls and/or other types of pushed content to the user.

Figure 3:
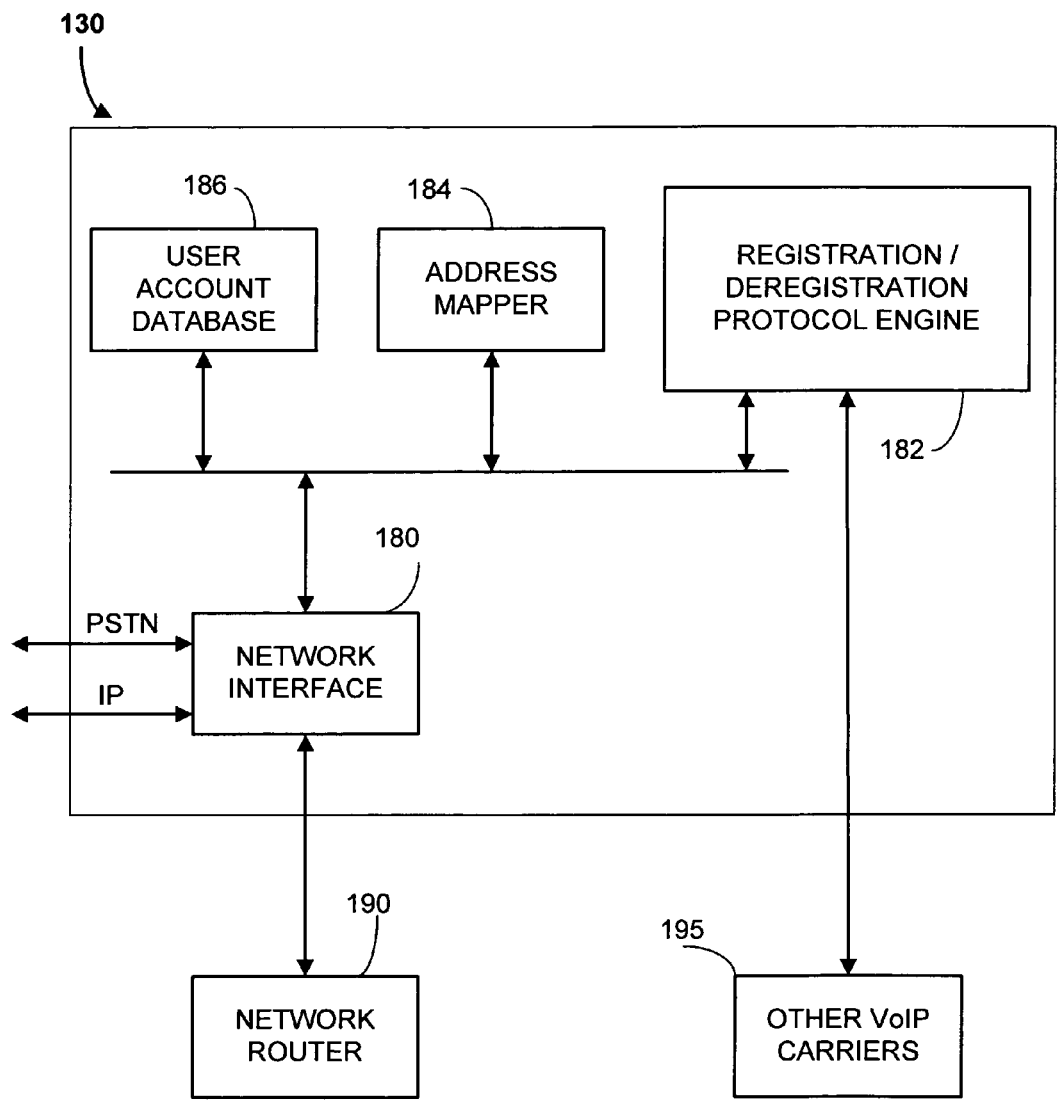
FIG. 3 is a block diagram illustrating an embodiment of network server used to implement portable computerized and telecommunications services in accordance with aspects of the present invention.

Referring now to FIG. 3, the network server 130 is shown in further detail. The network server 130 includes a network interface 180 that, depending on the embodiment, can include connections to one or both of the PSTN 105 and the packet network 110. A registration/deregistration protocol engine 182 is operatively coupled to the network interface 180. The registration/deregistration protocol engine 182 is typically implemented as server-side software that runs on one or more processors, although this is not required. The typical hardware architecture of the network server 182 is that of a computer server that includes one or more processors coupled to memory, to bulk storage (e.g., hard disk), and to one or more I/O devices like the network interface 180. The registration/deregistration protocol engine 182 is also operatively coupled to a user account database 186 and an address mapper 184, both of which are typically implemented as software processes together with associated data structures in memory and/or mass storage. In some embodiments the server 130 is also distributed across one or more possibly geographically dispersed network server platforms.

In operation, a user device, such as user device 125, initiates a registration protocol. In such an embodiment, one or more data packets are received at the network interface 180. These packets are generated after the particular user has inserted the smart card 120 into the card reader CR (in embodiments that use a smart card), and possibly after the particular user has taken a further action like clicking on an icon presented in the GUI 165 or has entered a user name and password into a dialog window.

When the registration packets arrive at the network interface 180, they typically contain user identification and authentication data, application layer user address information data (such as email address, IP address, push content address, inbound telephone number, and/or a mobile IP follow-me wireless or wireline address such as a SIP address), as well as information that tells the network server the network address of the user device 125-129 that initiated the registration protocol.

When registration occurs, the network server 130 associates the particular user's D/AS and/or telecommunication services account as represented in the database 186 with the physical location of the user device 125-129 involved in the registration protocol used to register the user's new location. The mapper 184 maps the user account information to the user's current physical location which preferably corresponds to a physical network address occupied by the particular one of the user devices 125-129 used by the particular user to register with the network server 130.

Once registration occurs, the network interface communicates with a network router. In some cases a network router 190 may be a part of the network server 130. In general, though, part or all of the network router 190 may be external to the network server 130, and the network router 190 may be implemented using a distributed architecture and may involve route settings in a plurality of physical router devices. For example, when the user devices 125, 126 are VoIP based, the network router 190 is coupled to the packet network 110 so that VoIP traffic to and from the particular user's POP can be routed via the packet network 110 (e.g., the Internet) to the user device 125 or 126. The network router may be implemented on multiple physical routers that share router table information and work in concert to route packets from source to destination nodes across the packet network 110. Preferably, route reservations and delay minimization techniques are implemented in the router and are requested by the network server 130 to insure that time sensitive traffic is more rapidly processed so as provide improved communications quality or to maintain a particular quality of service.

In some embodiments, updated user location information (e.g., city, state, country) could be automatically communicated to the calling/message sending party, e.g., via auto-reply messaging, SMS, MMS, WAP, IM, or pop-up dialog, depending upon the user's privacy settings. However, in some instances, to maintain privacy and/or to have their location appear transparent to the calling/message sending party, the user may opt to not have any such updated location information communicated or otherwise made available to the public. On the other hand, the user could adjust the appropriate filter settings to ensure that only those parties whom the user desires to be informed of the user's current location are so notified.

In one exemplary method practiced by the system 100, the user enters his/her smart card into card reader CR, using user device 125, for example. Illustratively, the user has a follow-me telephone number in the 305 area code and receives calls via the POP #1. When the user device 125 implements a registration protocol with the network server 130, the user's account is preferably marked, and the address mapper causes a mapping to be made between the inward dial line corresponding to the particular user, on the one hand, and the physical network address of user device 125, on the other hand. In one type of embodiment, the network server 130 preferably sends data via the network interface 180 to the POP #1 to tell it a new destination address for packets received at the inward dial telephone line corresponding to the particular user. Optionally, the network interface is implemented with a network device like a router to ensure that the VoIP packet traffic traverses a network path with sufficient bandwidth and a low enough delay to achieve a particular minimum voice quality.

If the user device is of the same type as user devices 127, 128, then the network router 190 is part of the PSTN, for example, an intelligent network node that causes calls to the particular user's telephone number to be forwarded via the PSTN to the user device 127 or 128. If the user device 129 is used, the network router 190 may be a packet switched router or a circuit switched router, or the routing function may be implemented using one or more packet and/or circuit switched routers. In such embodiments, intelligent network based call forwarding may be used, or the network server 130 may communicate directly with the individual POP #1, for example, to have the POP #1 redial the new telephone number corresponding to the user device 128, for example.

If such an approach is used, an aspect of the present invention is to incorporate ANI-spoofing (automatic number identification spoofing) to cause the caller-ID information that is received at the user device 128 to relate to the original caller instead of the POP #1. ANI spoofing can be performed by forwarding the original caller identification information in a manner in which the telephone network will be tricked into believing that the call originating number of the POP #1 is the originating caller's number. This is typically possible because PBX type installations can now provide per-extension caller ID information to the telephone network. In this case, instead of providing the caller ID information of the extension used to place the outbound call from the POP #1 to the user device 128, the original caller ID information from the caller is provided to the PSTN 105 by the POP #1. In some embodiments, the PSTN need not be "tricked" but intelligent network software is used to allow the originating caller ID information to be forwarded to the final destination.

It should be noted that while FIG. 3 has been described primarily with respect to telephony services, the same types of registrations and call redirection capabilities can be provided for mobile computing applications. For example, if a user has a centralized account of any type, and receives pushed content and/or can push content to other users, the same concepts apply. Instead of voice telephone circuits, the system passes data messages. In some cases, other media types like video may be supported, and when multiple media are employed, in some cases the voice may travel over one type of path and be billed a certain way, and another co-circuit such as video and/or data may traverse a separate type of path and be billed in another way. Hence, voice and data may be combined, or may be used separately, but the same inventive concepts apply.

Another aspect of the invention involves routing of VoIP to VoIP calls from different VoIP carriers. For example, suppose carrier A is Vonage.com and carrier B is Net2Phone.com. Suppose both carriers provide their own sets of both inbound and outbound VoIP telephone gateways similar to POP #1 to POP #N. Now suppose a Net2Phone caller in Costa Rica makes an outbound call to a Vonage™ subscriber who uses the 703 area code POP #N. Suppose the Vonage™ subscriber is located in Bonaire, an island off of Venezuela. Normally the call would route from Costa Rica to a Net2Phone POP in the 703 area code, and then across the PSTN to the POP #N, and then back down to Bonaire via the Internet, until it reached the desktop VoIP gateway used by the Vonage™ subscriber.

In accordance with an aspect of the present invention, both of the carriers, e.g., Net2Phone™ and Vonage™, would deploy their own respective network servers 130. Now the registration/deregistration functions 182 of the two respective network servers 155 communicate via their respective network interfaces 180. A protocol like a router table protocol is used to allow the two carriers to learn the set of telephone numbers used by subscribers on the other VoIP carrier. Thenceforth, when a phone call is placed by the user in Costa Rica, the Net2Phone™ network will recognize the dialed telephone number as a Vonage™ number.

In accordance with one embodiment of the present invention, the protocol between the two VoIP carriers keeps the other VoIP carrier abreast of user locations and movements, so the Net2Phone™ carrier can route the call directly to the desktop VoIP gateway of the Vonage™ customer, at whatever location the Vonage™ customer happens to be presently situated.

In another embodiment, when the outbound call is detected, as a part of call setup, the Net2Phone™ network server 130 communicates with the Vonage™ network server 130 and causes the call to be routed via the router 190 to the Vonage™ user endpoint device. In either case, the call can be routed more directly, lowering costs and improving voice quality for inter-VoIP carrier calls. In an overall sense, the inventive concept could be viewed as loading VoIP telephone numbers into routing tables and synchronizing routing information between competing carriers to reduce costs and improve quality of the services offered by both carriers.

Figure 4:
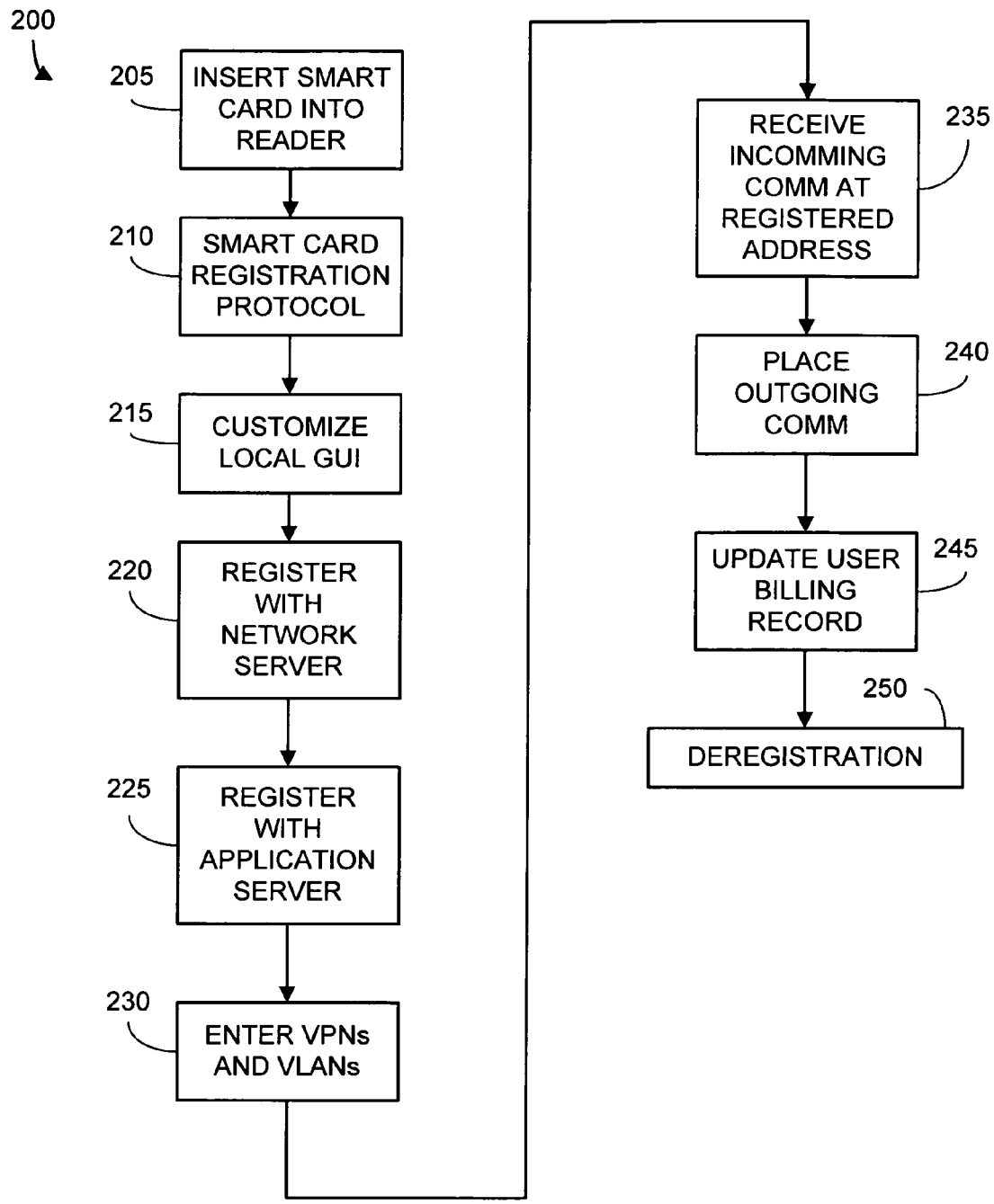
FIG. 4 is a flow chart illustrating a system level method as well as many individual sub-methods carried out by the various system components in order to implement portable computing and telecommunication services in accordance with aspects of the present invention.

Referring now to FIG. 4, a method 200 according to an embodiment of the present invention is illustrated in block diagram form. Initially (step 205), the particular user plugs the smart card 120 into a card reader CR of a user device such as any of the user devices 125-129 of FIG. 1. In response (step 210), a smart card registration protocol is implemented between the smart card 120 and the card reader CR. Optionally (step 215), a local GUI is initialized on a user device (e.g., user device 125, but could be any of user devices 125-129) associated with the card reader CR. Optionally (step 220), a network registration protocol is implemented between the user device 125 and the network server 130. Optionally (step 225), one or more application registration protocols are implemented between the user device 125 and one or more application servers 135.

In embodiments in which the application server is a VPN access point or a VLAN hub, VPN and/or VLAN authentication and encryption exchanges are made to allow the user device to enter a VPN or VLAN (step 230).

In embodiments involving telephony circuits, multimedia communications, or pushed data messages, an incoming communication is received (step 235) for the particular user. This incoming communication may be received at a given POP or may be received via a push content server, etc. Based upon the redirection settings, as negotiated between the devices of FIG. 2 and FIG. 3 as per step 225, the incoming communication of step 235 is redirected to the user device 125-129 into whose card reader CR the smart card 120 is plugged. In certain preferred embodiments, the user may also place outgoing calls or send outgoing messages 240. Optionally, when the incoming communication is received (step 235) and/or the outgoing communication is transmitted (step 240) (or an outgoing call is initiated), the user's account is updated (step 245) to record the event in the user account database 186, and any per usage charges are charged to the user's D/AS or telecommunication services account.

When the user wishes to terminate a D/AS or telecommunication session 250, the user either logs out, for example using the GUI, or by extracting the smart card 120 from the card reader. When the session is terminated, subsequent incoming communications intended for the particular user are not forwarded to the particular user device 125-129 that the particular user was using, but instead the communications are either directed to a default user device (which the user could re-designate via the GUI) or are collected in, for example, a voice mail account, an email account, a push message account, or a multimedia messaging service account, for later retrieval, e.g., at steps 186 or 135. As discussed above, in particular embodiments, the smart card related steps of the method 200 can be replaced by a web site with a user login and a user data repository that holds some or all of the same information as may otherwise be maintained on the smart card.

Another aspect of the present invention is to provide integrated VoIP, voice messaging and fax messaging. Present systems provide VoIP services and allow users to leave voice messages. The voice messages can be retrieved from a secured web site and/or can be forwarded to a user's email account. However, present VoIP boxes include a second phone to be used for facsimile ("fax") communications. It is impractical to carry a fax machine to receive faxes when traveling. Other services, known as efax services, allow users to receive faxes and to retrieve the faxes via a secured web site and/or to be forwarded to a user's email account.

In an aspect of the present invention, a single VoIP account is provided that allows a user to receive VoIP calls and to receive fax messages using the efax technique. For example, the user may be provided two consecutive telephone numbers, one for voice and the other for fax. The user may optionally have a fax machine plugged into a VoIP line for fax over IP, but can also redirect incoming fax calls to an efax type service provided as an integrated portion of the VoIP service. In this manner, missed VoIP calls go to a unified messaging mail box (and/or are forwarded to the user's email address) and faxes are treated the same way. If a user wishes to receive faxes at a physical fax machine, this option may still be provided on a second VoIP line used for fax, but if the user is on the road, he/she can cause faxes to be redirected to the efax messaging portion of the VoIP service. In some embodiments, the second VoIP line for fax is not provided, but instead an efax functionality is provided to handle faxes. However, an aspect of the present invention involves a VoIP provider that allows users to receive VoIP calls, to receive voice messages at a secured web site and/or via email forwarding with a voice mail attachment, and/or to receive faxes via a secured web site and/or via email forwarding with an image file attachment (e.g., as a .tif, .gif, .bmp, or .pdf file).

Also, any of the user devices 125-129 can have a fax machine functionality built in. In embodiments in which the user devices 125-126 are designed with a fax machine built in, the fax machine need not be an ordinary fax machine. Instead, the built in fax machine may be configured as a scanner and may deliver scanned documents as fax messages ("e-faxes"), for example, as image file attachments, to a recipient's email address, e.g., in a .gif, .tif, .bmp, or .pdf image file format). The device 129 may include both options, i.e., the user device 129 may send ordinary faxes via the PSTN to destination fax machines, or may send scanned images directly to email addresses. In general, depending on the embodiment, the built-in fax machine can send fax tones over IP (FoIP), can email scanned images, or in the case of the user devices 127-129, may also send faxes over the PSTN. Further, any combination of the above may also be implemented. The user preferences stored on the smart card may therefore include fax numbers and/or email addresses that can be used to send fax image files. i.e., e-faxes.

In a similar embodiment, a user is provided with a single VoIP telephone number. If the user does not pick up the line, a message is played. If the incoming call is a voice call, the caller can leave a voice message. If the incoming call is a fax call, the service will recognize the fax tones of the calling fax machine and provide an efax messaging service. The user can then retrieve the message from a secure web site and/or have the voice (e.g. .wav) or fax (e.g., .tif) message forwarded to the user's email account. In this type of embodiment, if the user picks up a call and hears fax tones, the user can press, for example, the * key, and this will cause the call to be redirected to an efax type service. That is in a preferred embodiment, the VoIP server listens to the call for the * tone, and if the * tone is detected, the VoIP server disconnects the call from the user and redirects the call to an efax server of the VoIP service provider's network equipment. The user can then hang up the phone and later retrieve the fax as a TIF or other type of image file as discussed above.

Now that the basic invention has been described, specific embodiments and variations will be described in further detail below.

In one embodiment, the system 100 can be used to provide portable telephony services, as follows. One or more network servers 130 manage a plurality of subscriber telecommunication service accounts in a database 186 associated with a plurality of users. The telecommunication service accounts include an account associated with a particular user who is assigned a follow-me telephone number to receive incoming telephone calls. The system as a whole includes a plurality of individual user smart cards. One of the smart cards includes a set of user-specific information corresponding to the particular telecommunication service account associated with the particular user. The system as a whole includes a plurality of smart card readers CRs (or, more generally, card readers).

Each card reader CR is coupled to (or incorporated into) a local telephony device (e.g., at steps 125-129) that is operative to receive incoming telephone calls and/or to place outgoing calls. For example, when the particular smart card is plugged into a first smart card reader, telephone calls directed to the particular user's follow-me telephone number are received at a first telephony device, and when the particular smart card is plugged into a second smart card reader, telephone calls directed to the particular user's follow-me telephone number are received at a second telephony device, thus allowing the particular user to roam to and from different areas, and to plug his/her smart card 120 into different devices in different localities, and to use different telephony devices as though they were the user's private wireline or wireless telephone.

The first card reader CR may be located in the particular user's home, and the second telephony device may be a public telephone, for example. Alternatively, the first card reader CR reader may be located in a user's cellular telephone and the second card reader CR may be located in a separate country from the country that provides the network services for the cellular telephone. The second card reader CR may also be provided in a hotel room along with the second telephony device. The first card reader CR may be located in the particular user's home, and the second card reader CR may located at the user's office or at a friend's house. Either of the telephony devices may be cell phones, PSTN wireline phones, phones connected to PBX internal networks, VoIP gateways connected via RJ-45 connectors to the packet network 110, or dedicated VoIP phones. Again, the card reader CR can optionally be incorporated into the VoIP gateway and/or the telephony device and/or a local computing device and/or the broadband access device (e.g., cable or DSL modem). For example, the first telephony device may be coupled to the PSTN via a subscriber line or cellular wireless air interface connection, and the second telephony device may be coupled via a voice over IP (VoIP) gateway to the Internet.

In preferred embodiments, the local telephony device is configured to place outbound telephone calls. When the particular smart card 120 is plugged into the first card reader CR, outbound telephone calls placed at the first telephony device are recorded in the particular user's telecommunication services account and when the particular smart card is plugged into the second smart card reader CR, outbound telephone calls placed at the second telephony device are also recorded in the particular user's telecommunication services account (e.g., by a VoIP network/service provider administrator function).

When the smart card 120 is plugged into the first card reader CR, the first card reader causes a handshaking protocol to be transacted with at least one of the one or more network servers 130 in order to register the location in the network where the first card reader CR is located, so that the incoming telephone call can be routed to the first telephony device. When the smart card is plugged into the second card reader CR, the second card reader causes a handshaking protocol to be transacted with at least one of the one or more telecommunication servers in order to register the location in the network where the second card reader CR is located, so that the incoming telephone call can be routed to the second telephony device. The smart card 120 may also hold a set of user preference data that is used to configure a user interface provided by the telephony device whose card reader CR the smart card 120 is plugged into, to thereby enable the associated telephony device to apply a set of user customizations previously configured by the user. In a preferred embodiment, the user preference data is preferably read from a home station user device that was previously configured by the user so that the smart card 120 retains the user preferences programmed into the user's home station device.

Smart card 120 also preferably holds a set of user filter data that is used to configure a telephony filter that allows incoming calls to be selectively allowed to ring through or to be blocked, forwarded to another phone number, converted to e-mail and/or diverted to voice mail, as described in detail previously. As discussed above, the user filters may also be applied to other types of incoming communications, such as SMS messages, IM messages, MMS messages, email messages, and WAP push protocol messages, for example.

In other embodiments, the present invention encompasses a mobile computing type of system that provides portable computer services. With this type of embodiment, the system incorporates one or more network servers 130 that manage a plurality of subscriber D/AS service accounts associated with a respective plurality of particular users. The D/AS service accounts 186 include a particular user's account. The particular user is assigned a follow-me address used to receive the aforementioned various types of incoming push content or any other form of push content in general, e.g., broadcast packets from an 802.11 (WiFi) or Bluetooth hotspot.

In some embodiments, the mobile computing version of the system also includes a plurality of smart cards associated with respective users. Each smart card includes a storage medium and, optionally, one or more application programs that execute on an optional processor in the smart card and/or on a host computing device coupled to a smart card reader CR. The smart card holds a set of user-specific information corresponding to an associated particular user's D/AS service account. The system also includes a plurality of smart card reader devices, each being coupled to a local computerized device that is operative to receive one or more types of incoming push messages. When the particular smart card is plugged into a first smart card reader CR, push messages directed to the particular user's follow-me address are received at a first computerized device. When the particular smart card is plugged into the second smart card reader CR, push messages directed to the same address are received at a second computerized device.

In another type of embodiment, the system 100 is configured to provide portable computer services. In many implementations of this type of embodiment, the system 100 also includes a plurality of smart cards, each smart card being associated with a corresponding particular user. Each smart card employs a storage medium and optionally includes a processor and one or more application programs that reside in the storage medium and run on the processor in the smart card and/or on a host computing device coupled to a smart card reader CR. The smart cards are each configured to provide a set of user-specific information corresponding to an associated set customized user interface configuration data. A particular smart card 120 is configured to provide information corresponding to a particular user's customized user preference and configuration data.

The system 100 includes a plurality of smart card readers CR, each being coupled to a local computerized device that is operative to provide a customized user interface to a user. The plurality of smart card readers includes a first smart card reader coupled to a first computerized device and a second smart card reader coupled to a second computerized device. When the particular smart card 120 is plugged into the first smart card reader CR, a particular customized user interface associated with the particular user is presented to the particular user to interface with a set of one or more application programs on the first computerized device. When the particular smart card 120 is plugged into the second smart card reader, the particular customized user interface is presented to the particular user to interface with the set of one or more application programs on the second computerized device.

The particular user interface may be used for one or more of a variety of purposes. One exemplary use of the user interface is to define how information downloaded from a remote host computer is converted into Windows style GUI interface information. This may include a style such as an applied tiling used with the GUI. Another example is to define a set of desktop settings on a personal computer's GUI or to define a remapping of the keyboard. The particular user interface may also define a set of notification tones to be played (and/or other types of alerts to be triggered) when an incoming message is received. The particular user interface may also be utilized to define a set of instant messaging addresses contained in an instant messaging buddy list, an email list, or a set of telephone numbers used in a calling list such as is commonly used with a cellular telephony device or PDA. The particular user interface may also define how a set of application program icons and windows are arranged on a user interface display such as a desktop. Such a definition typically also defines a set of application programs available to the user and also the version numbers of the application programs to be loaded, etc.

In this general type of embodiment, the first and second computerized devices are both coupled to a data network which is coupled to one or more application servers 135. The particular user interface specifies how a set of application program icons and windows are to be arranged on a user interface display, and, preferably, at least one of the application program icons, when activated, launches a function which automatically establishes communications with at least one of the application servers to make the application program available on the appropriate one of the first and second computerized devices when the smart card is plugged into the respective smart card reader.

The application servers are typically operated by one or more application service provider (ASP) entities. The particular user interface then specifies a set of one or more application programs to be loaded from the application server 135 and how a set of application program icons and windows are to be arranged on a user interface display and at least one of the application program icons, when activated, launches an application program that has been downloaded from the application server. In some embodiments, portions of the application programs may reside on the smart card 120, in which case, the application program icon, when activated, causes to be executed at least some application program code located on the smart card.

The present invention also contemplates a server side method practiced by the network server 130. The server side method involves first receiving, via a network connection, from a computerized device, information identifying a particular telecommunication services subscriber. The information is derived by the computerized device via a protocol handshake between a smart card reader and a smart card inserted therein by the particular telecommunication services subscriber. The method then involves configuring a communication path so that one or more incoming communications addressed to the particular telecommunication services subscriber are redirected to a network address associated with the computerized device. Depending on the embodiment, the communication path may be a circuit switched communication path, a packet switched communication path, or a secured virtual private network path.

The present invention also contemplates a server side method practiced by the network server 130. The server side method involves first receiving from a computerized device, via a network connection, information identifying a telecommunication services subscriber. The information is supplied by a user who logs into a web site which is under the control of the network server 130, using the computerized device. The supplied information may also include a cookie that contains local information related to the computerized device from which the user is logging into the web page. The computerized device can be the user's own or a third party's desktop computer, laptop computer, handheld computer, PDA, smart phone, network terminal, a VoIP unit implementing features of the present invention, or any other suitable computerized device that enables the user to remotely log-in to a server.

The method then involves configuring a communication path so that one or more incoming communications addressed to the telecommunication services subscriber are redirected to a network address associated with the computerized device. This method may be implemented, for example, by client software that runs on the computerized device and/or server software that runs on the network server 130 and/or one or more other remote servers. The client software can be pre-installed and/or be embodied as an applet or servlet supplied by the server(s) and/or can be loaded from a portable storage medium, smart card, laptop computer, handheld computer, PDA, smart phone, or any other suitable source. Depending on the embodiment, the communication path may be a circuit switched communication path, a packet switched communication path, or a secured virtual private network path.

With this "cardless" remote log-in procedure, the user can access data and/or application services (D/AS) and/or telecommunication services in the same or similar manner as previously described in connection with other embodiments involving the use of a smart card, media card, or portable storage medium and associated card reader. For example, the computerized device can be coupled to or integrated with a wireless or landline telephony device and/or a VoIP box and/or a network communications device that is in turn coupled via a PSTN, a WAN, MAN, Internet, cellular, or any other type of packet-switched or circuit-switched network that enables delivery of telecommunications and/or data and/or application services, such as e-mail, voice mail, e-faxes, telephony (voice) calls, MMS, SMS, IM, WAP, etc., including the "follow-me" VoIP service of the present invention.

In essence, the user can simply use his/her own or any suitable $3^{rd}$ party computerized device (as an authorized guest/visitor) to remotely log-in to the appropriate service provider's network server (e.g., the VoIP service provider's designated server), in order to register (preferably automatically, under program control) the user's current location and forwarding telephone number for "follow-me" VoIP calls to be forwarded to, and to adjust, as desired, the user's configurations, filters, settings, and/or other parameters, and/or to record a new announcement/greeting, and/or to program an auto-reply message and/or to update any required user-specific information, e.g., account information.

The system of the present invention also encompasses a method of adding a node to virtual private network. The application server 135 receives via a network connection from a remote computerized device authentication data identifying a virtual private network subscriber. The information is derived by the computerized device from a protocol handshake between a smart card reader and a smart card plugged therein. The application server 135 then causes to be configured a virtual private network communication path from the server to the first computerized device, so that the first computerized device is added to the virtual private network and can communicate the server and with any other devices already connected to the virtual private network The present invention also encompasses an endpoint user device 125-129 that provides portable telecommunication services. Such an endpoint user device includes a smart card reader device incorporating a smart card protocol function that is operative to perform a smart card protocol handshake with a smart card plugged therein and to thereby receive information about a particular user's telecommunication services account. The device also includes a local telephony device that is adapted to be coupled to a telecommunications network to at least receive incoming telephone calls. A registration protocol function is coupled to communicate via a network connection to a central telecommunications server. At least partially in response to receiving information from the smart card protocol handshake, the registration protocol function is operative to perform a registration protocol handshake with the central telecommunications server to identify to the central telecommunications server that the particular subscriber has registered its smart card with the endpoint user device. Thenceforth, subsequent incoming telephone calls directed to the portable telephone number will be redirected to the local telephony device. Also, a deregistration protocol function performs a deregistration protocol handshake with the central telecommunications server at a time later than the registration protocol handshake, in order to instruct the central telecommunication server to cease redirecting calls intended for the portable telephone number to the local telephony device.

With this endpoint user device, incoming telephone calls to the portable telephone number that are received after the registration protocol handshake but before the deregistration protocol handshake are redirected to the telephony device. Preferably, the smart card comprises a storage medium including an application program. The application program is configured to provide a set of information corresponding to an associated telecommunication service account.

Another aspect of the invention is the use of a smart card to enable the provisioning of portable telecommunication services. The smart card preferably includes a storage medium that stores user-specific data, such as a user authentication code, a private encryption key, a public-key certificate, a password(s), a username, and/or any other information associated with a user telecommunications services account(s) and/or any other information required to enable provisioning of the desired data and/or application and/or telecommunications services. The smart card also includes a communications interface for transferring at least selected portions of the user-specific data (e.g., user authentication and account information) via a card reader to a host device (e.g., a computer connected to the Internet) that is communicatively coupled with a remote server(s) for implementing one or more of the methods of the present invention. In some embodiments, the card reader is of the contactless or wireless (e.g., RFID) variety, i.e., is implemented as a wireless smart card interface. When the smart card is plugged into or otherwise wirelessly coupled to a first smart card reader, telephone calls directed to a follow-me telephone number associated with the user's telecommunications services account are received at a first telephony device associated with the first card reader. When the smart card is plugged into or wirelessly coupled to a second smart card reader, telephone calls directed to the follow-me telephone number are received at a second telephony device associated with the second card reader.

The present invention further encompasses a "VoIP pay phone" in which a "public telephone number" is assigned to a pay phone that is coupled to or incorporated into a common housing with a VoIP gateway, to thereby enable any member of the general public, whether or not they have a telecommunications account with a VoIP service provider, to place telephone calls using any convenient payment method, including, but not limited to, "electronic cash", credit card, collect, calling card, coins and/or any other convenient payment method. In this type of embodiment of a VoIP pay phone, pay phone service can be delivered at a significantly lower cost than is possible with current "standard pay phone" technology. Further, this VoIP pay phone embodiment can suitably be combined with the previously described "smart card pay phone" embodiment in which a user can insert a smart card (or other suitable media) into a smart card reader (or other type of media I/O device) in order to send and/or receive calls at the pay phone using the user's personal VoIP telephone number. In other words, with such a hybrid smart card/VoIP pay phone embodiment, the pay phone can be used by both people who have a personal VoIP account, and people who do not have a personal VoIP account, either using a smart card or any other convenient payment method.

Additionally, in all embodiments of the present invention in which a user "borrows" or "commandeers" $3^{rd}$ party computer or computerized user device ("host computer") in order to implement one or more aspects or features of the present invention, a file management program can advantageously be implemented in order to, optionally, accomplish one or more or any combination of the following: (1) allocate different, password protected user-specific file storage areas for each respective user of the host computer, for securely storing all user files and associated data generated by the user during each user session in order to maintain the privacy, security, integrity, and confidentiality thereof (this may have particular utility in situations in which the user is a regular or frequent visitor to a particular facility, such as a branch office, plant, distribution center, or the like) and/or (2) automatically launch an auto-virus scan before, during, and/or after each user session, in order to prevent infection of the host computer by spyware, adware, trojan horses, and/or other viruses present in the data and/or programs generated, downloaded and/or installed by various users of the host computer and/or (3) launch an "auto-cleanup" wizard at the end of each user session, e.g., as part of the log-off procedure, in order to (either automatically or at the user's option, depending on the embodiment) delete (or preferably securely wipe so that no data bit residues are left on the user device) all files and associated data generated by the user during the respective user session, and/or to optionally transfer all such user-specific files and associated data to a remote storage location (e.g., a Web-based storage space provided by the user's VoIP and/or D/AS service provider) and/or transfer such files and data to a local portable storage medium.

Although the present invention has been described with reference to specific embodiments, numerous other variations, modifications, extensions, and/or alternative embodiments of the various inventive concepts disclosed herein which may occur to those skilled in the art will still fall within the spirit and scope of the present invention. Therefore, it is to be understood that the present invention encompasses all such variations, modifications, and embodiments that do not depart from the spirit and scope of the invention as defined in the appended claims.

What is claimed is:

1. A system comprising: one or more computers programmed to execute instructions to cause the one or more computers to:
   maintain, at a device, a database that includes a plurality of 10-digit PSTN-compatible telephone numbers associated with a respective plurality of users of a respective plurality of VoIP telephony endpoints; and
   in the event, at the system, any particular one of the plurality of VoIP telephony endpoints is located at a first location and has a first network connection with a first network address, facilitate the directing of a first incoming call to the particular VoIP telephony endpoint at the first location via the first network connection and the first network address, and
   in the event, at the system, the same particular one of the plurality of VoIP telephony endpoints is located at a second location and has a second network connection with a second network address, facilitate the directing of a second incoming call to the same particular VoIP telephony endpoint at the second location via the second network connection and the second network address;
   wherein the first incoming call and the second incoming call are each identified by a particular 10-digit PSTN-compatible telephone number associated with the same particular one of the plurality of VoIP telephony endpoints;
   wherein the first incoming call and the second incoming call originate from a PSTN endpoint and are coupled via a packet switched network to the same particular one of the plurality of VoIP telephony endpoints as respective first and second VoIP calls via the first and second network connection with the first and second network address; wherein the first and second network connection having different network configuration; and wherein the same particular one of the VoIP telephony endpoints comprises a cellular telephone.

2. The system as recited in claim 1, wherein the first location corresponds to a first geographical location and the second location corresponds to a second geographical location.

3. The system as recited in claim 1, wherein the first incoming call comprises a PSTN telephone call initiated from a telephony endpoint that is connected to the PSTN.

4. The system as recited in claim 1, wherein the first incoming call comprises a circuit switched telephone call initiated from a cellular telephone.

5. The system as recited in claim 1, wherein the facilitate the directing of the first incoming call comprises a coupling of first information to a telephony service.

6. The system as recited in claim 5, wherein the facilitate the directing of the second incoming call comprises a coupling of second information to the telephony service.

7. The system as recited in claim 6, wherein the first information comprises a first network address that facilitates routing of the first VoIP call to the first location and the second information comprises a second network address that facilitates routing of the second VoIP call to the second location.

8. The system as recited in claim 1, wherein the facilitate the directing of the first incoming call comprises a coupling of information to a telephony service.

9. The system as recited in claim 1, wherein the facilitate the directing of the second incoming call comprises a coupling of information to the telephony service.

10. The system as recited in claim 8, wherein the information comprises a network address that facilitates routing of the first VoIP call to the first location.

11. The system as recited in claim 9, wherein the information comprises a network address that facilitates routing of the second VoIP call to the second location.

12. A system comprising: one or more computers programmed to execute instructions to cause the one or more computers to:
   maintain, at a device, a database that includes a plurality of VoIP subscriber identifiers associated with a respective plurality of users of a respective plurality of VoIP telephony endpoints; and
   in the event, at the system, any particular one of the plurality of VoIP telephony endpoints is located at a first location and has a first network connection with a first network address, facilitate the directing of a first incoming call to the particular VoIP telephony endpoint at the first location, and in the event, at the system, the same particular one of the plurality of VoIP telephony endpoints is located at a second location and has a second network connection with a second network address, facilitate the directing of a second incoming call to the same particular VoIP telephony endpoint at the second location via the second network connection and the second network address;
   wherein the first incoming call and the second incoming call are each identified by a particular VoIP subscriber identifier associated with the same particular one of the plurality of VoIP telephony endpoints; wherein the first incoming call and the second incoming call originate from a PSTN endpoint and are coupled via a packet switched network to the same particular one of the plurality of VoIP telephony endpoints as respective first and second VoIP calls via the first and second network connection with the first and second network address; wherein the first and second network connection having different network configuration; and wherein the same particular one of the VoIP telephony endpoints comprises a cellular telephone.

13. The system as recited in claim 12, wherein the plurality of VoIP subscriber identifiers associated with the respective plurality of users of the respective plurality of VoIP telephony endpoints correspond to a respective plurality of 10-digit PSTN-compatible telephone numbers.

* * * * *